US012335215B1

(12) United States Patent
Sundar et al.

(10) Patent No.: US 12,335,215 B1
(45) Date of Patent: Jun. 17, 2025

(54) PROVIDING AN INSTANT MESSAGING INTERFACE FOR DATA ANALYTICS

(71) Applicant: Salesforce, Inc., San Francisco, CA (US)

(72) Inventors: Kartik Sundar, San Francisco, CA (US); Katherine Anne Maertens, Seattle, WA (US); Yukiko Ishida Anonuevo, Concord, CA (US); Naomi Menahem, Seattle, WA (US); Bailiang Zhou, Seattle, WA (US); Manish Tripathi, San Francisco, CA (US); Jared Briskman, Redwood City, CA (US)

(73) Assignee: Salesforce, Inc., San Francisco, CA (US)

( * ) Notice: Subject to any disclaimer, the term of this patent is extended or adjusted under 35 U.S.C. 154(b) by 224 days.

(21) Appl. No.: 18/102,663

(22) Filed: Jan. 27, 2023

Related U.S. Application Data

(60) Provisional application No. 63/303,944, filed on Jan. 27, 2022.

(51) Int. Cl.
*G06F 9/54* (2006.01)
*H04L 51/046* (2022.01)
*H04L 51/18* (2022.01)

(52) U.S. Cl.
CPC .............. *H04L 51/18* (2013.01); *G06F 9/543* (2013.01); *H04L 51/046* (2013.01)

(58) Field of Classification Search
None
See application file for complete search history.

(56) References Cited

U.S. PATENT DOCUMENTS 9,740,874 B2 * 8/2017 Mahkovec .......... G06F 21/6218
10,474,352 B1 11/2019 Winters et al.
(Continued)

FOREIGN PATENT DOCUMENTS

EP 3535676 A1 9/2019
WO WO2020/076811 A1 4/2020

OTHER PUBLICATIONS

Atallah, Preinterview First Office Action, U.S. Appl. No. 16/940,267, Feb. 22, 2022, 6 pgs.
(Continued)

*Primary Examiner* — Rinna Yi
(74) *Attorney, Agent, or Firm* — Morgan, Lewis & Bockius LLP

(57) ABSTRACT

The various implementations described herein include methods and devices for providing an instant messaging interface for data analytics. In one aspect, a method includes displaying a user interface for a communication application, including displaying a shared link to a graphical data visualization. A snapshot button near the link is used to generate a link snapshot comprising a version of the graphical data visualization. In response to user activation of the snapshot button, the method generates the link snapshot. To generate the link snapshot the method first determines if the user or users have proper security access to view the data contained in the graphical data visualization. If a user has proper security access to a subset of the data from the data source, the method dynamically generates the link snapshot for the subset of data to which the user has security access.

19 Claims, 25 Drawing Sheets

(56) References Cited

U.S. PATENT DOCUMENTS

| | | |
|---|---|---|
| 10,515,121 B1 | 12/2019 | Setlur et al. |
| 10,546,001 B1 | 1/2020 | Nguyen et al. |
| 10,749,831 B2* | 8/2020 | Zhong .................... H04L 51/08 |
| 2004/0210532 A1* | 10/2004 | Nagawa .............. G06F 21/6218 705/51 |
| 2015/0046429 A1 | 2/2015 | Eblighatian et al. |
| 2015/0154156 A1* | 6/2015 | Meyers, Jr. ........... G06F 40/134 715/205 |
| 2015/0195330 A1* | 7/2015 | Lee ..................... H04L 67/5651 709/204 |
| 2016/0012739 A1* | 1/2016 | Jafari ....................... G09B 5/06 709/204 |
| 2016/0283447 A1* | 9/2016 | Masterson ........... G06Q 10/107 |
| 2017/0011023 A1 | 1/2017 | Ghannam et al. |
| 2017/0076507 A1 | 3/2017 | Bivins |
| 2017/0154089 A1 | 6/2017 | Sherman |
| 2017/0249711 A1 | 8/2017 | Odegard |
| 2017/0277669 A1 | 9/2017 | Sekharan |
| 2017/0277696 A1 | 9/2017 | Sekharan |
| 2017/0308571 A1 | 10/2017 | McCurley et al. |
| 2018/0144064 A1 | 5/2018 | Krasadakis |
| 2018/0189294 A1 | 7/2018 | Anand et al. |
| 2019/0163807 A1 | 5/2019 | Jain et al. |
| 2019/0272296 A1 | 9/2019 | Prakash et al. |
| 2020/0241903 A1 | 7/2020 | Wang et al. |
| 2020/0293167 A1 | 9/2020 | Blyumen |
| 2020/0387556 A1* | 12/2020 | Uppal ................. G06F 16/9035 |
| 2021/0004370 A1 | 1/2021 | Sekharan et al. |
| 2022/0172723 A1 | 6/2022 | Tendolkar |

OTHER PUBLICATIONS

Atallah, First Action Interview Office Action, U.S. Appl. No. 16/940,267, Mar. 22, 2022, 5 pgs.

Atallah, Notice of Allowance, U.S. Appl. No. 16/940,267, Aug. 4, 2022, 7 pgs.

Hearst, Office Action, U.S. Appl. No. 17/206,046, Feb. 10, 2022, 17 pgs.

Hearst, Final Office Action, U.S. Appl. No. 17/206,046, Sep. 12, 2022, 18 pgs.

Hearst, Office Action, U.S. Appl. No. 17/206,046, Mar. 9, 2023, 20 pgs.

Hearst, Notice of Allowance, U.S. Appl. No. 17/206,046, Oct. 18, 2023, 9 pgs.

Tableau Software, LLC, International Search Report and Written Opinion, PCT/US2021/040919, Oct. 18, 2021, 11 pgs.

Thom, Notice of Allowance, U.S. Appl. No. 17/583,164, Feb. 15, 2023, 23 pgs.

* cited by examiner

PROVIDING AN INSTANT MESSAGING INTERFACE FOR DATA ANALYTICS

RELATED APPLICATIONS

This application claims priority to U.S. Provisional Application Ser. No. 63/303,944, filed Jan. 27, 2022, entitled "Using a Communications Application to Analyze and Distribute Data Analytics," which is incorporated by reference herein in its entirety.

TECHNICAL FIELD

The disclosed implementations relate generally to data analytics and more specifically to systems, methods, and user interfaces that enable users to analyze and distribute data analytics within a communication application. This application specifically focuses on link unfurling for data analytics within a communication application.

BACKGROUND

Data analytics applications enable a user to understand a data set visually, including distribution, trends, outliers, and other factors that are important to making business decisions. Some data sets are very large or complex and include many data fields. Various tools can be used to help understand and analyze the data, including dashboards that have multiple data visualizations. However, some functionality may be difficult to use or hard to find within a complex user interface. Moreover, data visualizations and reports created by a user can be difficult to replicate and distribute to others. Often users are forced to use screenshots of graphical representations or metrics in order to share them within a communication application, thus bypassing security settings.

SUMMARY

Companies are relying more on analytical insights to gain a competitive advantage and propel their business forward. Many companies have employees who have a responsibility to monitor company performance and find, view, and share analytical assets. It can be challenging to create and share analytic assets.

Companies are also beginning to rely more on communication applications for intra-company communication. Communication channels allow for one-to-many communication, keeping teams connected and promoting a connected and collaborative culture. The present disclosure describes systems and methods for integrating data analytics into a communication application. In this way, users are able to quickly and efficiently share analytic asset images, without having to switch between applications or follow complex exportation procedures.

For example, systems of the present disclosure enable users to link their communication applications with their data analytics applications and then use the resulting inter-application communication to share analytic asset images within the communication applications. In some circumstances, this improves user efficiency by reducing the amount of human-machine interactions. In some circumstances, this also reduces a computational load on the user's computing device by not requiring processing resources or memory for separate execution of the full data analytics application. For example, the communication application automatically executes the data analytics application in a headless browser to generate the analytic asset image, which is captured for use in the communication application.

In accordance with some implementations, a method is performed at a computing device. The method includes displaying a user interface for a channel of a communication application, which includes a shared link to a graphical data visualization of data from a data source. A snapshot button is near the link, and the snapshot button is configured to generate a link snapshot. The link snapshot comprises a version of the graphical data visualization representing data from the data source, to which the user has security access. In response to user activation of the snapshot button, the method further includes generating the link snapshot. The link snapshot is generated by identifying the access permissions of the user for the data from the data source. Based on the access permissions, the system determines that the user has security access to view a subset of the data from the data source. The method further includes generating the link snapshot for the subset of the data, and displaying the link snapshot near the shared link in the communication application.

In some implementations, a computing device includes one or more processors, memory, a display, and one or more programs stored in the memory. The programs are configured for execution by the one or more processors. The one or more programs include instructions for performing any of the methods described herein.

In some implementations, a non-transitory computer-readable storage medium stores one or more programs configured for execution by a computing device having one or more processors, memory, and a display. The one or more programs include instructions for performing any of the methods described herein.

Thus, methods, systems, and graphical user interfaces are disclosed that enable users to analyze and distribute data analytics within a communication application. Such methods may complement or replace conventional methods for analyzing and distributing data analytics.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

With more companies having employees working remotely from around the globe, communication applications (e.g., Slack or other instant messaging systems) have become a primary means of communication for many employees and teams. Therefore, it is increasingly important for users to be able to create and distribute data analytics to their coworkers and teams via the communication applications. For example, when sales team members want to share the latest numbers on sales with their team, they share a graphical data visualization link within a communication application. Generally, each member of the team who received the message would be require to click on the link, and log into the analytics application from which the graphical data visualization originates in order to view the shared graphical data visualization. The present invention, however, allows team members to view and download the graphical data visualization without ever leaving the communication application interface. The team members are able to view the graphical data visualization as a snapshot in the communication application, as long as their security allows them access to a subset of data contained in the graphical data visualization.

Figure 1:
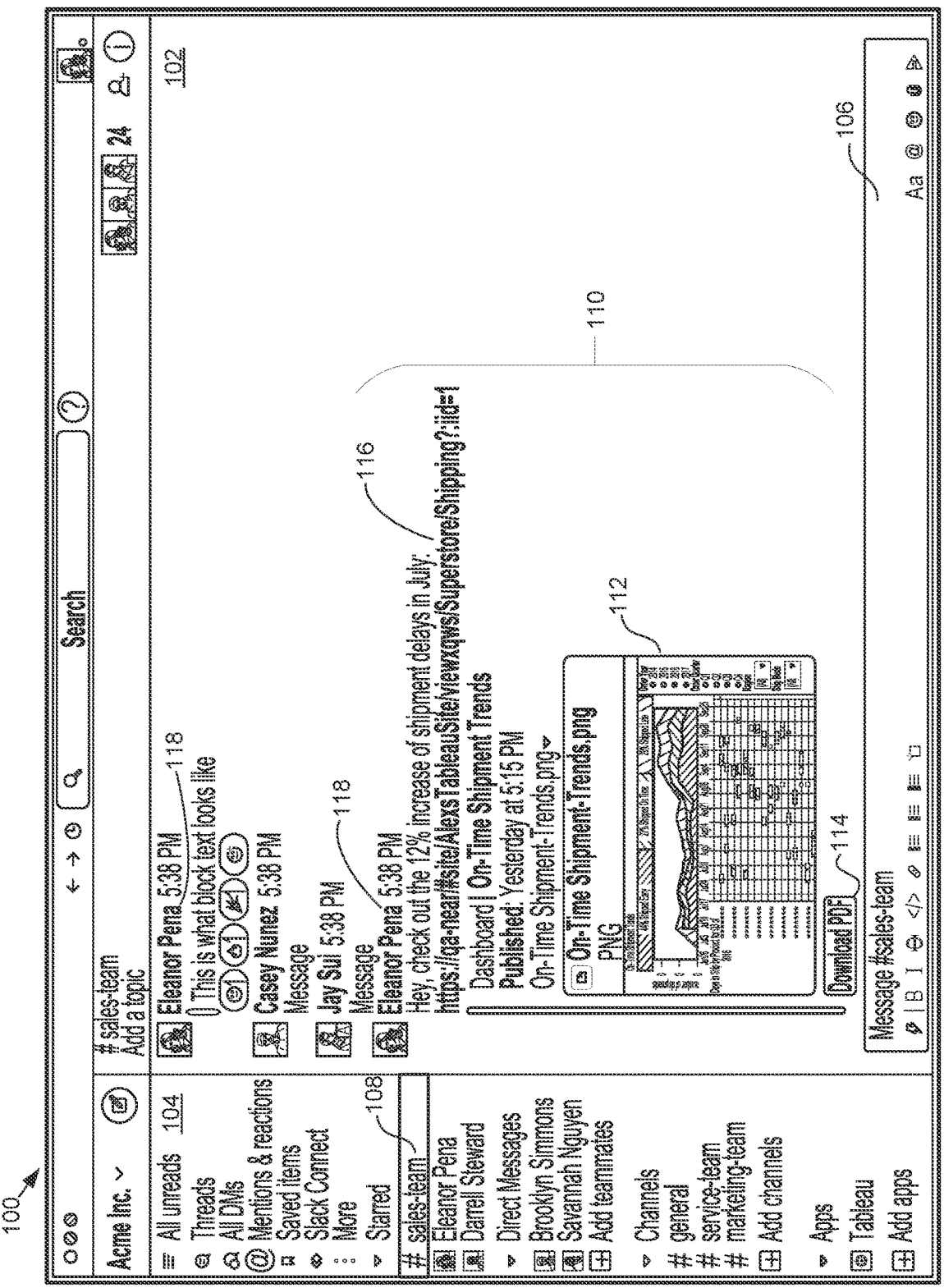
FIG. 1 shows a graphical user interface of a communication application in accordance with some implementations.

FIG. 1 shows a graphical user interface 100 of a communication application in accordance with some implementations. The graphical user interface 100 enables a user (the "sending user") 118 to communicate with other users (the "receiving users," such as other members of the #sales-team 108). FIG. 1 shows a communication channel 102, a navigation tab 104 (also sometimes called a navigation panel), and a data entry box 106 for drafting a new message to be sent to receiving users. The communication channel 102 in FIG. 1 is a "sales-team" channel (also sometimes called a page) for the company Acme Inc. The "sales-team" channel can be a public channel as shown in FIG. 1 or a private channel as indicated by the lock icon 702 in FIG. 7A. The channel 102 displays message threads that can be viewed by the members of sales-team channel. FIG. 1 specifically shows a message 110, which includes a link 116 to a graphical data visualization dashboard titled "On-Time Shipment Trends," as well as a link snapshot 112 (e.g., a preview of the graphical data visualization) and a "Download PDF" button 114. The "Download PDF" button allows the receiving users in the sales-team channel to download a PDF version of the graphical data visualization directly from the communication application.

Figure 2:
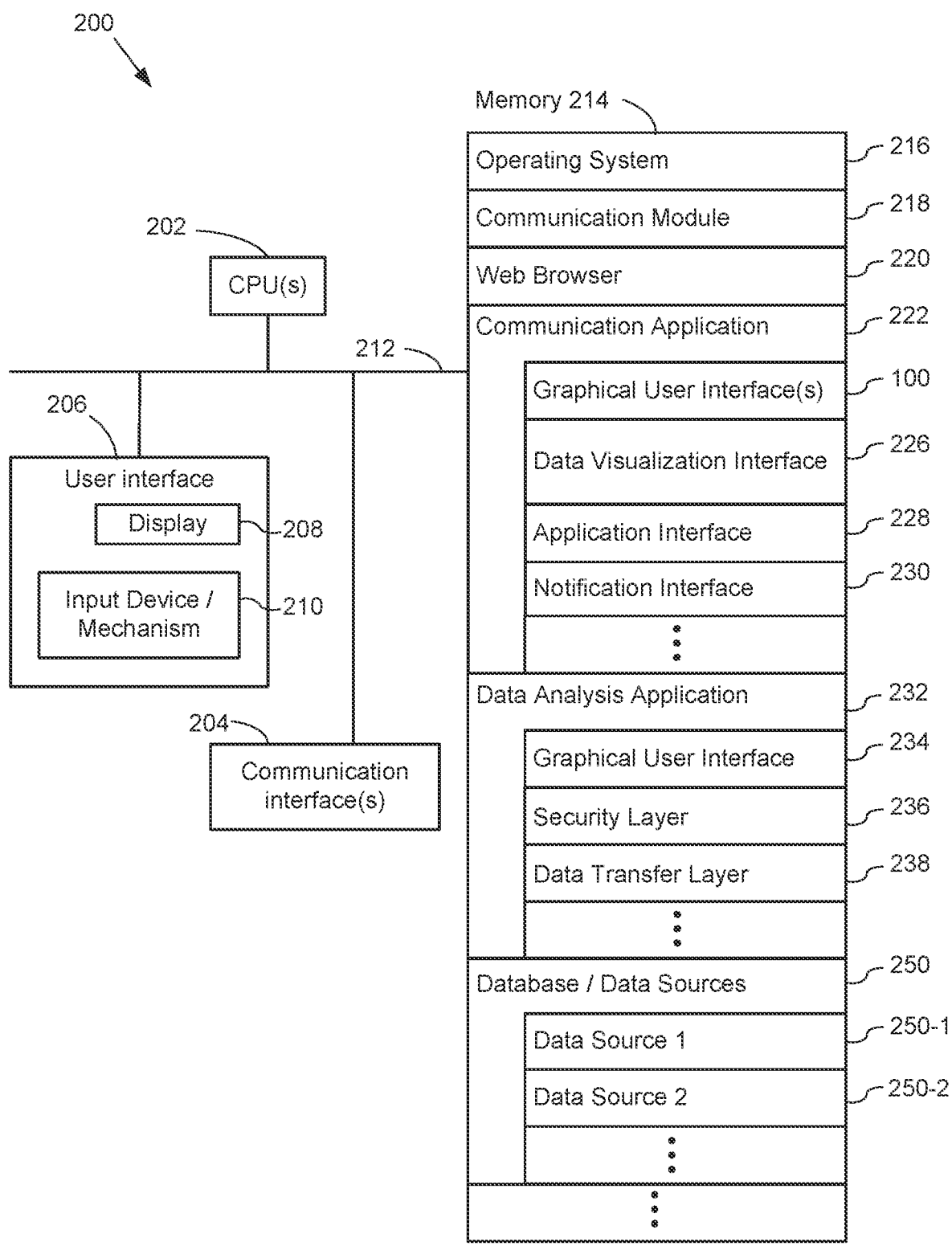
FIG. 2 is a block diagram of a computing device in accordance with some implementations.

FIG. 2 is a block diagram of a computing device 200 in accordance with some implementations. FIG. 2 illustrates a computing device 200 capable of displaying the graphical user interface 100 in accordance with some implementations. Various examples of the computing device 200 include a desktop computer, a laptop computer, a tablet computer, and other computing devices that have a display and a processor capable of running a communication application 222. The computing device 200 typically includes one or more processing units/cores (CPUs) 202 for executing modules, programs, and/or instructions stored in the memory 214 and thereby performing processing operations; one or more network or other communication interfaces 204; memory 214; and one or more communication buses 212 for interconnecting these components. The communication buses 212 may include circuitry that interconnects and controls communication between system components.

The computing device 200 includes a user interface 206 comprising a display device 208 and one or more input devices or mechanisms 210. In some implementations, the input device/mechanism includes a keyboard. In some implementations, the input device/mechanism includes a "soft" keyboard, which is displayed as needed on the display device 208, enabling a user to "press keys" that appear on the display 208. In some implementations, the display 208 and input device/mechanism 210 comprise a touch screen display (also called a touch sensitive display).

In some implementations, the memory 214 includes high-speed random-access memory, such as DRAM, SRAM, DDR RAM or other random-access solid-state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternatively the non-volatile memory device(s) within the memory 214, comprises a non-transitory computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communication module 218, which is used for connecting the computing device 200 to other computers and devices via the one or more communication network interfaces 204 (wired or wireless) and one or more communication networks, such as the Internet, other wide area networks, local area networks, metropolitan area networks, and so on;
- a web browser 220 (or other application capable of displaying web pages), which enables a user to communicate over a network with remote computers or devices;
- a communication application 222, which provides a graphical user interface 100 for a user to communicate with other users. For example, a user communicates with other users via one or more channels or in direct messages. The communication application 222 includes a data visualization interface 226, which takes the user input and obtains a corresponding visual graphic (also referred to as a "graphical data visualization"). The data visualization interface 226 then displays the generated link snapshot (e.g., the graphical data visualization preview) in the user interface 100. In some implementations, the communication application 222 executes within the web browser 220 or another application using web pages provided by a web server. The communication application 222 includes an application interface 228 for linking or integrating other applications into the communication application 222. In some implementations, the application interface 228 executes functions of the linked or integrated applications (e.g., without launching a separate standalone application). In some implementations, the application interface 228 executes a linked application in a headless browser and captures results from the headless browser. The communication application 222 includes a notification interface 230 for obtaining and presenting notifications to users. For example, the communication application 222 pulls (or receives) data from linked applications and presents users with notifications or alerts about the data;

a data analysis application 232, which provides tools and a graphical user interface 234 to analyze data. For example, a user creates analytic assets and data visualizations from various data sources 250. The data analysis application 232 includes a security layer 236, which authenticates users and applies permissions (e.g., read, write, and share permissions) for user data and analytic assets. The data analysis application 232 displays the user's analytic assets and data visualizations in the user interface 234 or transfers them to other applications via a data transfer layer 238. The data analysis application 232 includes the data transfer layer 238 for transferring data, data visualizations, and analytic assets to other applications (e.g., linked applications or applications requesting information with proper user credentials). In some implementations, the data transfer layer 238 executes as a standalone application (e.g., a desktop application); and one or more databases or data sources 250 (e.g., a first data source 250-1 and a second data source 250-2), which are used by the communication application 222 and/or the data analysis application 232. In some implementations, the data sources are stored as spreadsheet files, CSV files, XML files, or flat files, or stored in a relational database.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. Furthermore, the memory 214 may store additional modules or data structures not described above.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

Figure 3A:
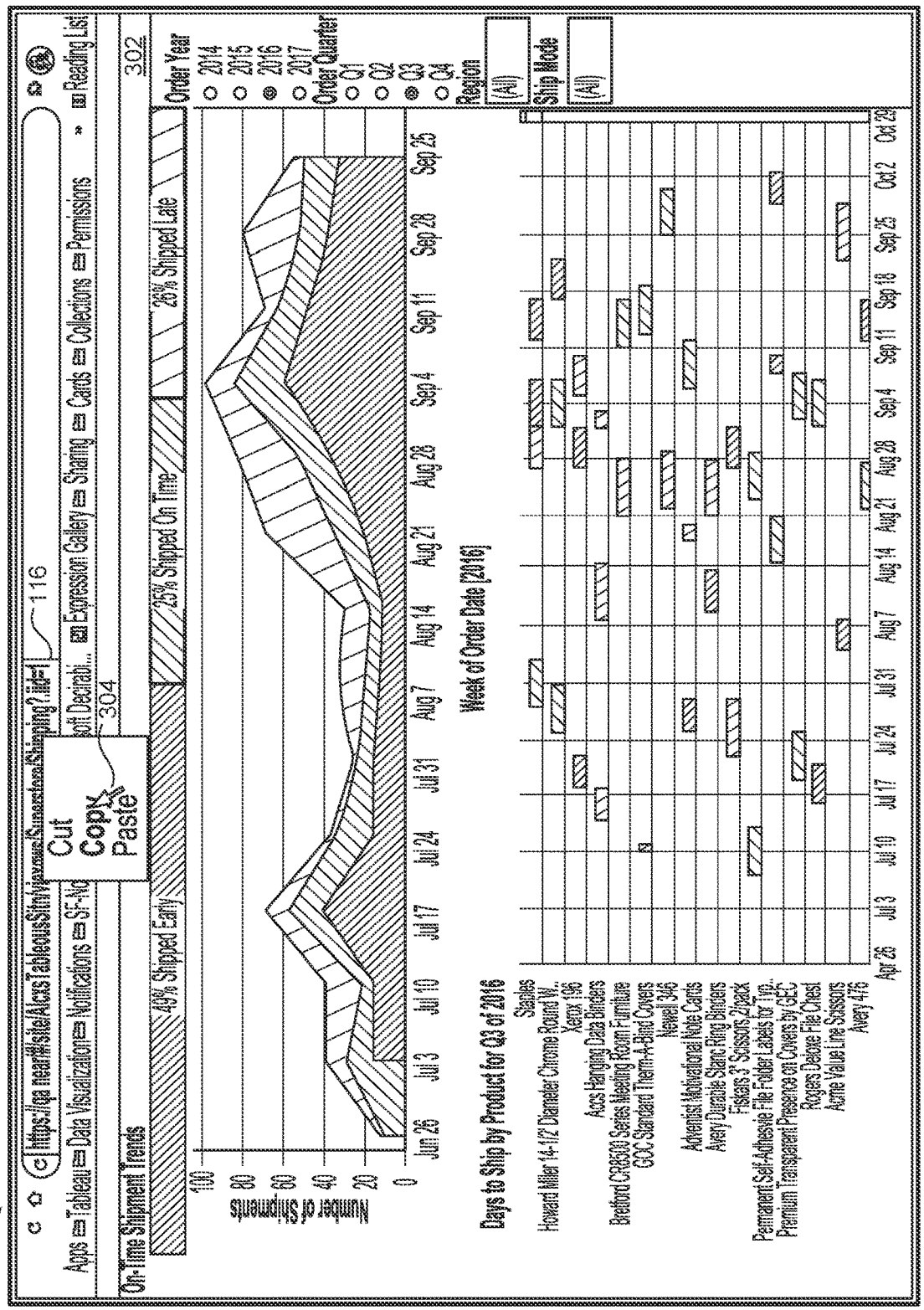
FIGS. 3A-3D illustrate user interactions with the graphical user interface of FIG. 1, in accordance with some implementations.

FIGS. 3A-3D illustrate interactions by a sending user 118 with the graphical user interfaces 234 and 100 in accordance with some implementations. FIG. 3A shows an implementation of the user interface 234 for the data analysis application 232 in a web browser. In some implementations the data analysis application 232 is accessed through a stand-alone (e.g., desktop) application rather than a web browser. In this implementation, the user interface 234 displays the "On-Time Shipment Trends" dashboard as the graphical data visualization 302.

FIG. 3A further demonstrates the sending user 118 copying 304 the link 116 to the graphical data visualization 302 to share the link through the communication application 222. In some implementations, the sending user 118 does not have to copy and paste the link; instead, the user activates a share button within the graphical user interface 234 to push the link to the appropriate channel within the communication application 222. In some implementations, the sending user 118 can use the communication application 222 to pull the link from the data visualization application 232.

Figure 3B:
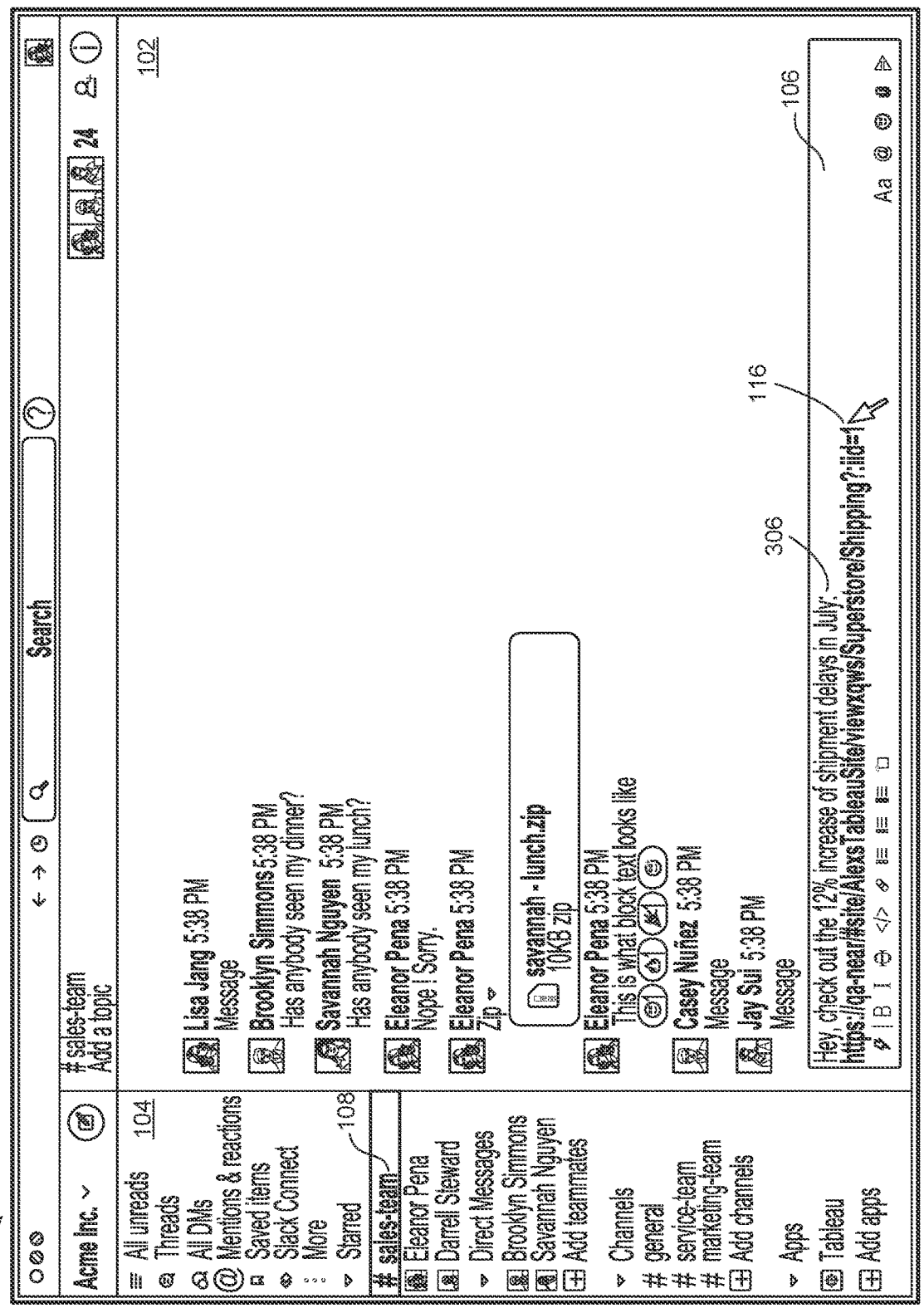

FIG. 3B illustrates the sending user 118 typing a message 306 into the data entry box 106 for the public "sales-team" channel 108. The sending user 118 pastes into the message 306 the previously copied link 116. The link 116 leads to the graphical data visualization 302. The navigation tab 104 of the application view 100 in FIG. 3B includes the selected "sales-team" channel 108 as well as direct messages and other channels. In some instances, the sending user 118 performs these actions in a direct message to a particular individual instead of to a group.

Figure 3C:
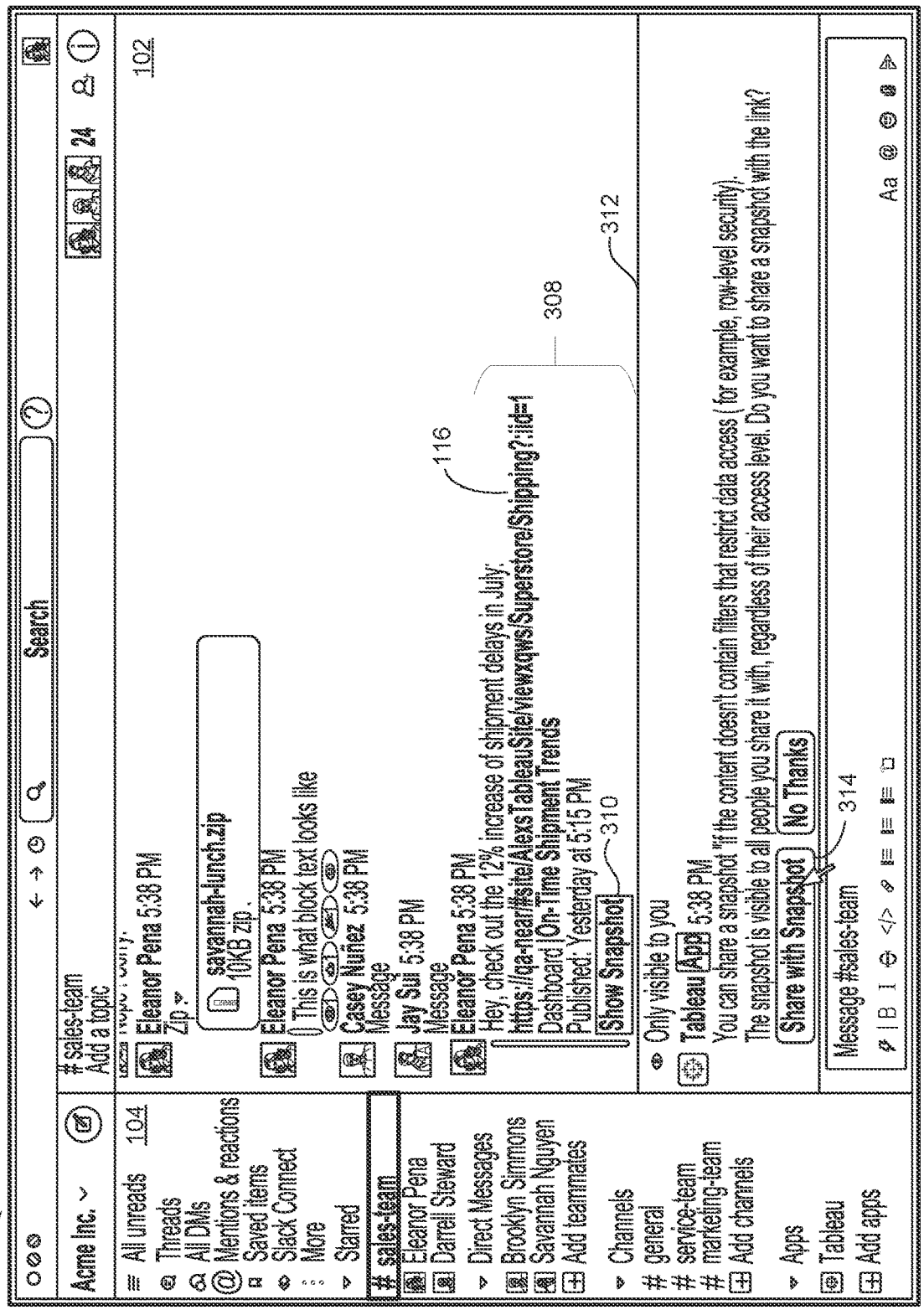

FIG. 3C shows the graphical user interface 100 of the communication application 222 after the sending user 118 sends the message 306. In accordance with some implementations, the communication application recognizes the pasted link 116 as a link to the graphical data visualization 302 within the data analysis application 232. The communication application 222 therefore includes a "Show Snapshot" button 310 at the bottom of the sent message 308. In practice, and as recognized by those of ordinary skill in the art, the "Show Snapshot" button 310 can be placed anywhere in the spatial vicinity of the message 308. For example, the "Show Snapshot" button 310 could be placed immediately to the right of, on top of, or in general vicinity of the sent message 308. The sent message 308 including the snapshot button is visible to all receiving users with access to the "sales-team" channel 108 where the message was sent.

In some implementations, upon sending the message 306, the sending user 118 receives a notification 312. The notification 312 indicates that the user can generate a snapshot for all the members in the "sales-team" channel 108 as long as the content of the graphical data visualization does not contain filters that restrict data access (i.e., the content of the graphical data visualization does not have security access restrictions). The notification 312 also includes the "Share with Snapshot" button 314. In some implementations, the sending user 118 is able to select the "Share with Snapshot" button 314 to generate the snapshot for all members of the "sales-team" channel 108.

In some implementations, the notification 312 allows the sending user 118 to generate a snapshot visible to all receiving users in the "sales-team" channel 108 even when the content in the graphical data visualization 302 contains filters that restrict data access. In those cases, when the sending user 118 activates the "Share with Snapshot" button 314, the system generates the link snapshot 112 for those members of the "sales-team" channel 108, who have appropriate security to access a subset of data in the graphical data visualization 302, dynamically adjusting the link snapshot for each receiving user based on individual security permissions.

Figure 5:
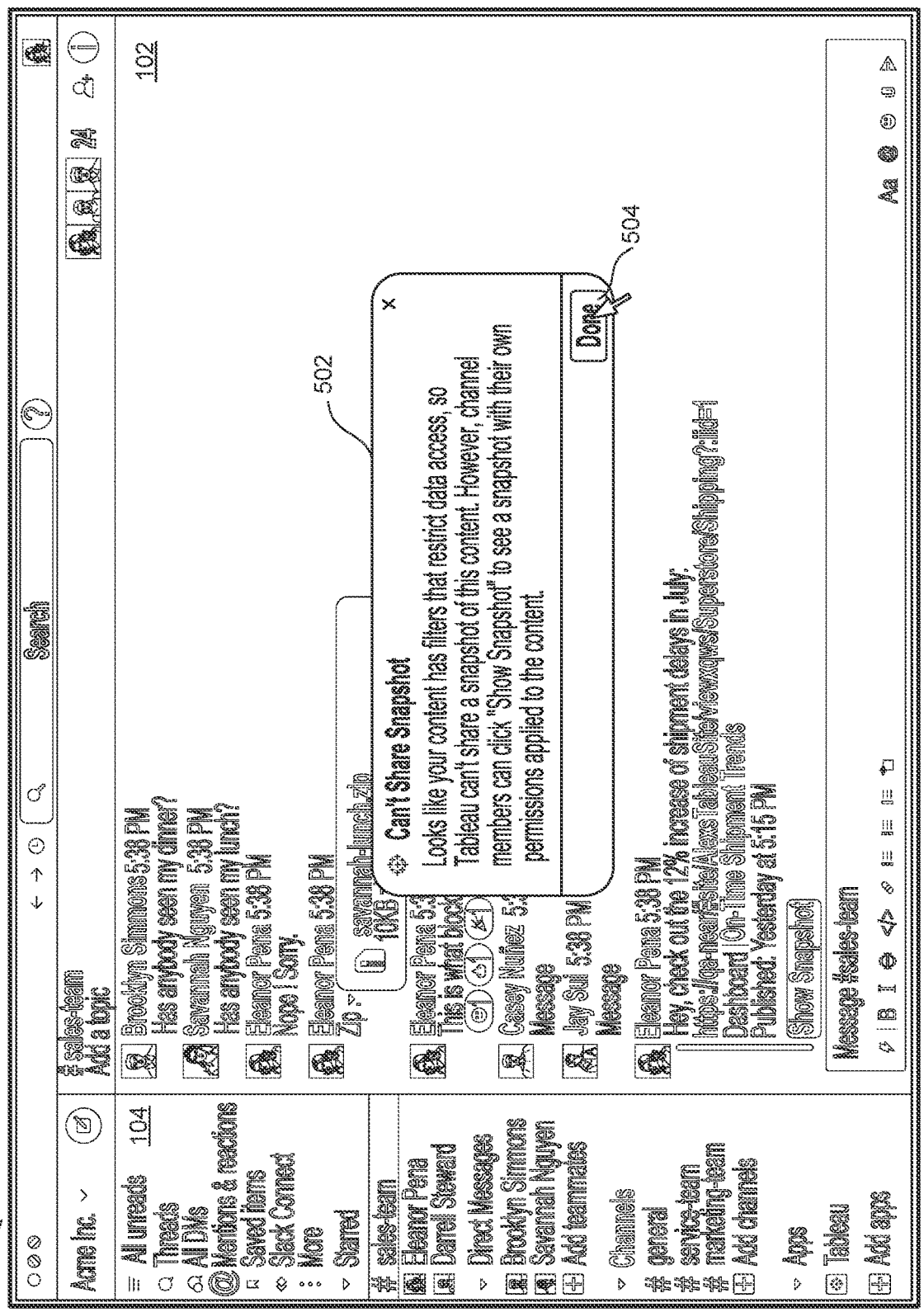
FIG. 5 illustrates a user interaction with the graphical user interface of FIG. 1, in accordance with some implementations.

FIG. 3C further shows the sending user 118 selecting the "Share with Snapshot" button 314 (e.g., clicking on the button). In some implementations, in response to the sending user 118 selecting the "Share with Snapshot" button 314, the system generates the link snapshot 112 for all receiving users. In some implementations, when the shared graphical data visualization 302 contains filters that restrict data access, in response to the sending user 118 selecting the "Share with Snapshot" button 314, the system dynamically generates a respective link snapshot for each receiving user according to the security access. A receiving user must have access to at least a subset of the data utilized in the graphical data visualization 302 in order to have a link snapshot generated. In some implementations, when the shared graphical data visualization 302 contains filters that restrict data access, in response to the sending user 118 selecting the "Share with Snapshot" button 314, the communication application 222 generates a notification 502, as shown in FIG. 5. In some implementations, in response to the sending user selecting the "Show Snapshot" button 310, the system generates the link snapshot 112 for the sending user only.

Figure 3D:
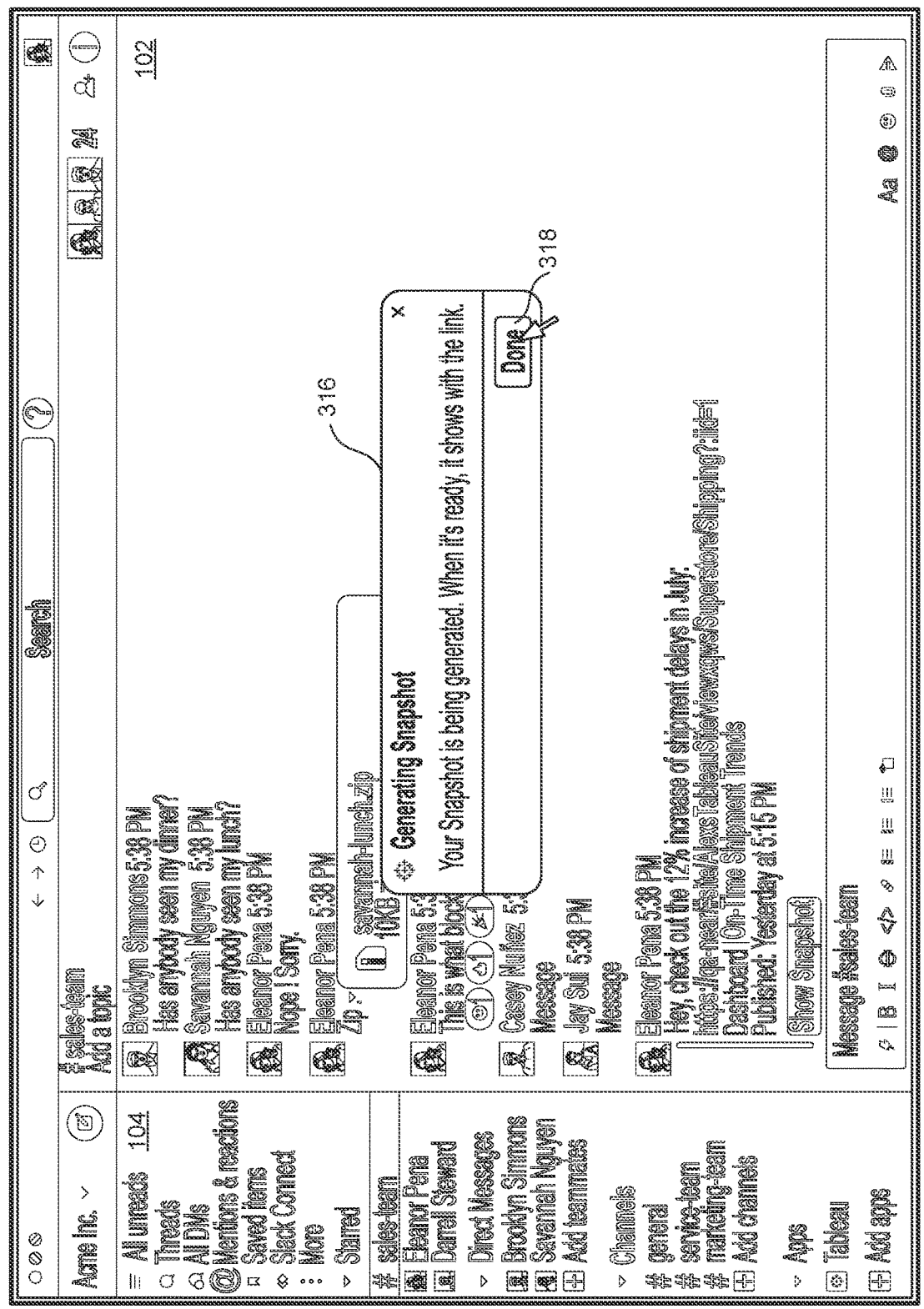

FIG. 3D illustrates the notification received by the sending user 118 who generates a snapshot. The graphical user interface 100 in FIG. 3D illustrates a notification 316, alerting the sending user 118 that the snapshot is being generated. FIG. 3D further shows the sending user 118 selecting the "Done" button 318 to dismiss notification 316. In some implementations, the notification 316 is a pop-up notification. In some implementations, the notification 316 is a message notification. In some implementations, after the link snapshot 112 is generated, each user with proper security access will see the message 110 with the link snapshot 112 and a "Download PDF" button 114, as shown in FIG. 1. In some instances, a receiving user's link snapshot 112 contains less content based on that user's security access.

Figure 4:
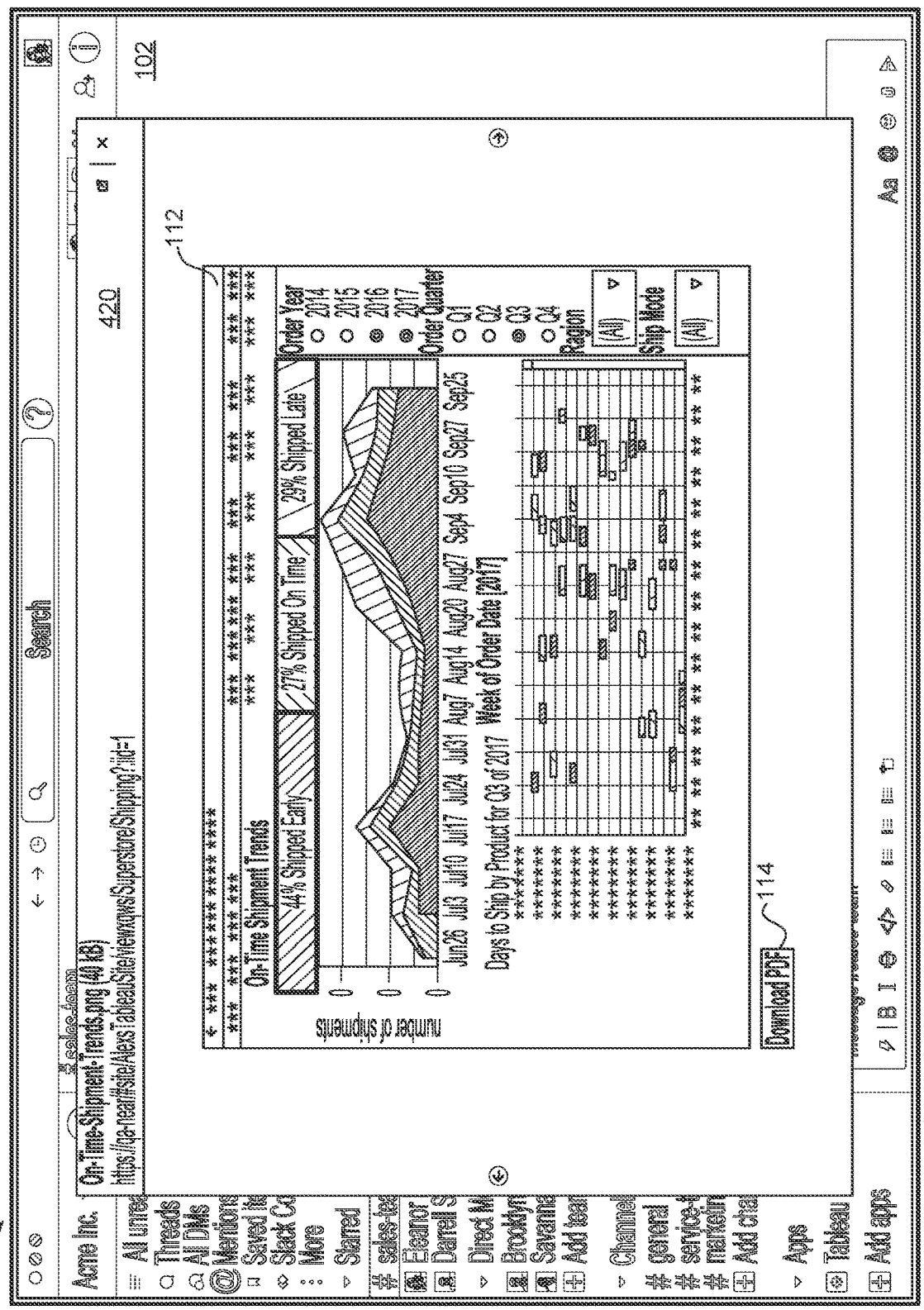
FIG. 4 illustrates a user interaction with the graphical user interface of FIG. 1, in accordance with some implementations.

FIG. 4 illustrates an enlarged version of the link snapshot 112 displayed in a separate window 420 (e.g., a pop-up window). In some implementations, any user can select the link snapshot 112 (e.g., by clicking on it) to enlarge it as shown in FIG. 4. When a user selects the link snapshot 112, the graphical user interface 100 displays a window 420 with the enlarged link snapshot 112 and a "Download PDF" button 114. In some implementations the user is able to select the "Download PDF" button 114 to download a PDF version of the link snapshot 112.

FIG. 5 illustrates a notification 502 received by the sending user 118 when the sending user 118 selects the "Share with Snapshot" button 314. In some implementations, the notification 502 alerts the sending user 118 that the snapshot cannot be generated due to security restrictions. FIG. 5 further shows the sending user 118 selecting the "Done" button 504 to dismiss the notification 502. In some implementations, the notification 502 is a pop-up notification. In some implementations, the notification 502 is a message notification.

Figure 6A:
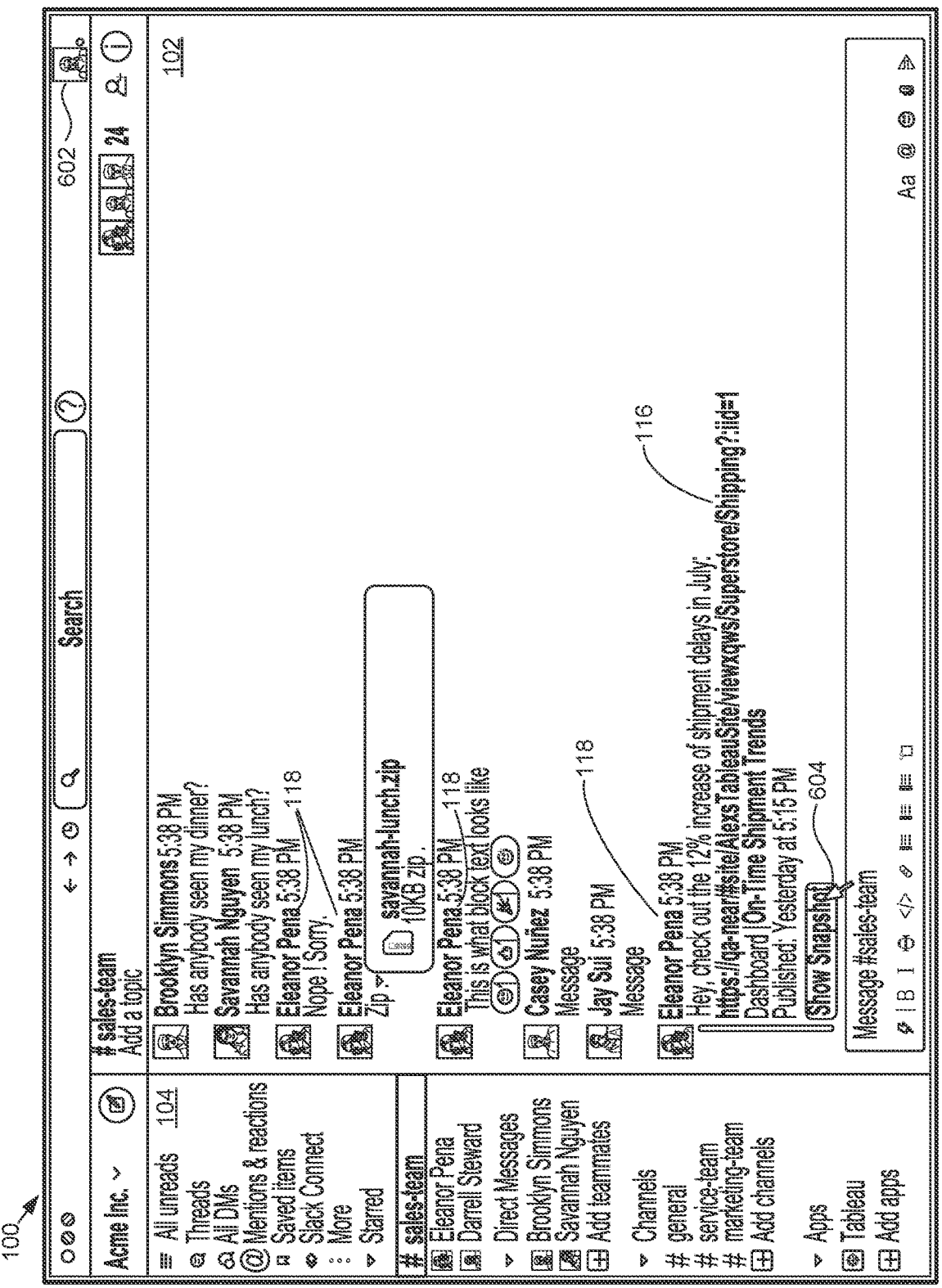
FIGS. 6A-6D illustrate user interactions with the graphical user interface of a communication application, in accordance with some implementations.

FIGS. 6A-6D illustrate interaction by a receiving user 602 with the graphical user interface 100 in accordance with some implementations. FIG. 6A illustrates the user interface 100 for the communication application 222, as viewed by a receiving user 602. FIG. 6A shows the receiving user 602 selecting the "Show Snapshot" button 604 on the message received from the sending user 118. The message includes a link 116 to the graphical data visualization 302 from the data analysis application 232. In some implementations, the receiving user 602 has proper security to access a subset of data in the graphical data visualization 302, and the system dynamically generates a link snapshot 112, based on the security access of the receiving user 602.

Figure 6B:
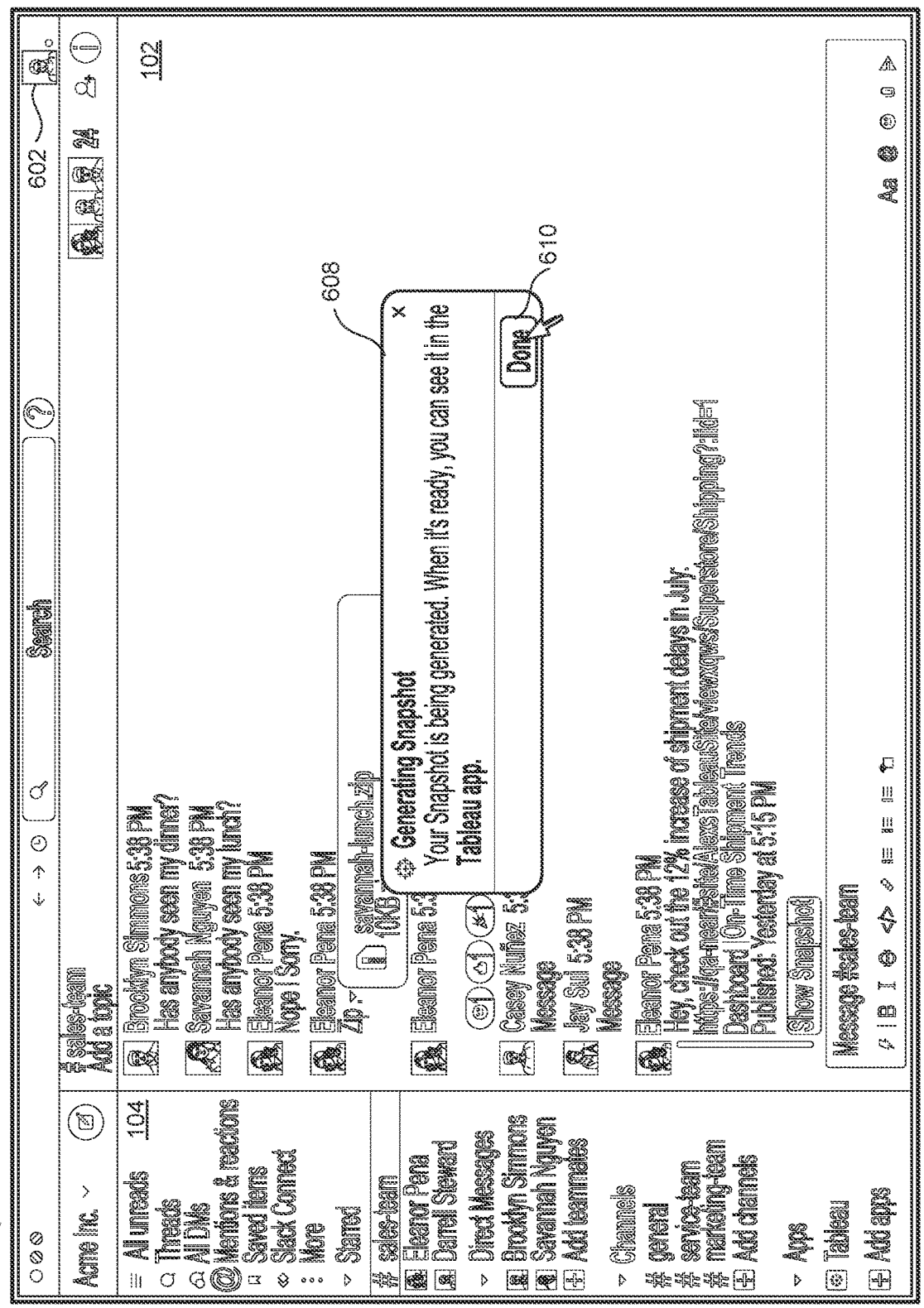

FIG. 6B illustrates the notification received by the receiving user 602 who selects the "Show Snapshot" button 604 in FIG. 6A. The graphical user interface 100 in FIG. 6B illustrates a notification 608, alerting the receiving user 602 that the snapshot is being generated. FIG. 6B further shows the receiving user 602 selecting the "Done" button 610 to dismiss notification 608. In some implementations, the notification 608 is a pop-up notification. In some implementations, the notification 608 is a message notification.

Figure 6C:
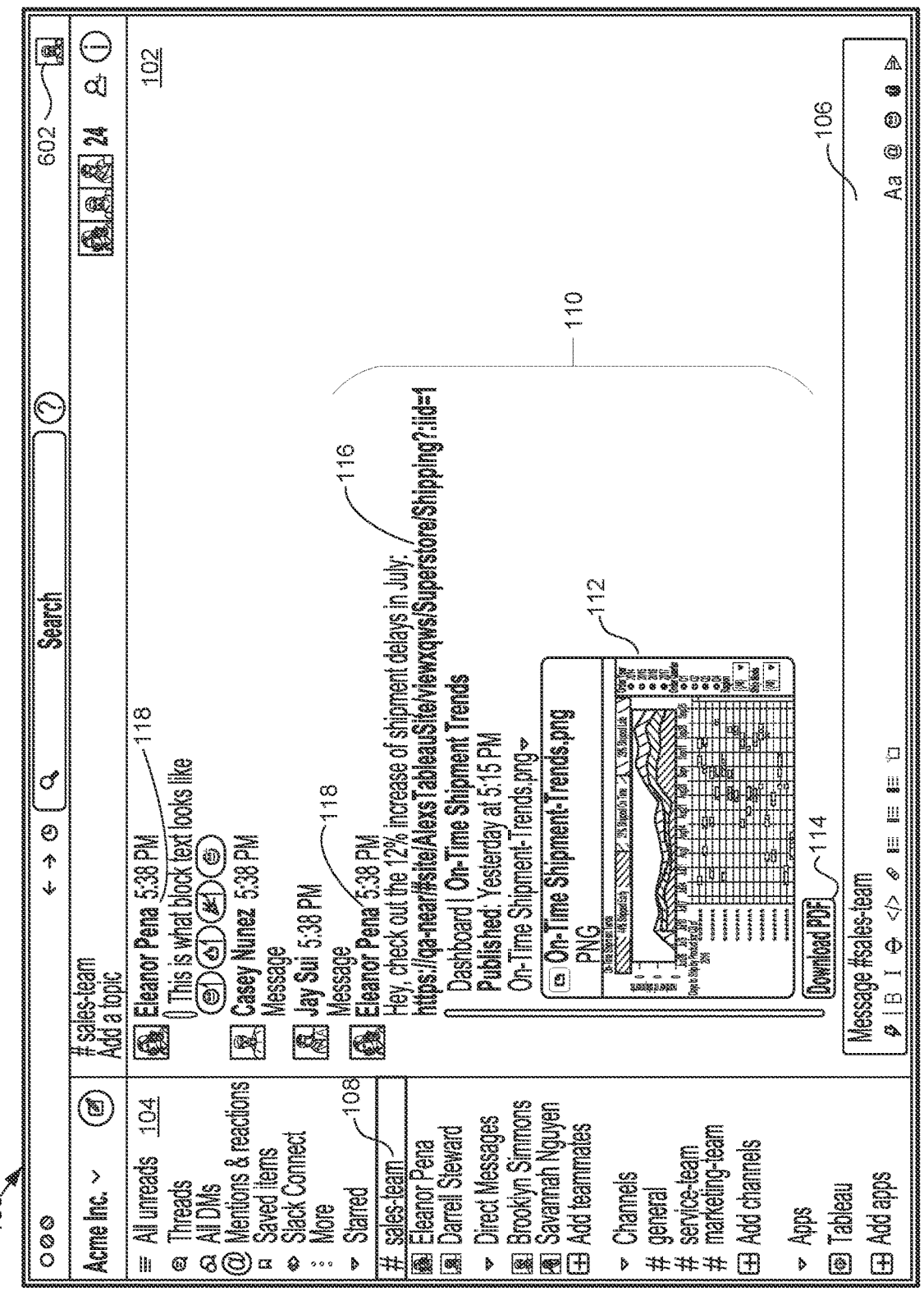

FIG. 6C illustrates a message 110 sent by the sending user 118 with a generated link snapshot 112 for the receiving user 602. In some implementations, the message 110 includes a link 116 to a graphical data visualization 302, as well as a link snapshot 112 and a "Download PDF" button 114. In some implementations, the "Download PDF" button 114 allows the receiving user 602 in the sales-team channel to download a PDF version of the graphical data visualization directly from the communication application. In some implementations, the receiving user 602 is able to enlarge the link snapshot button 112 by selecting it, as shown in FIG. 4.

Figure 6D:
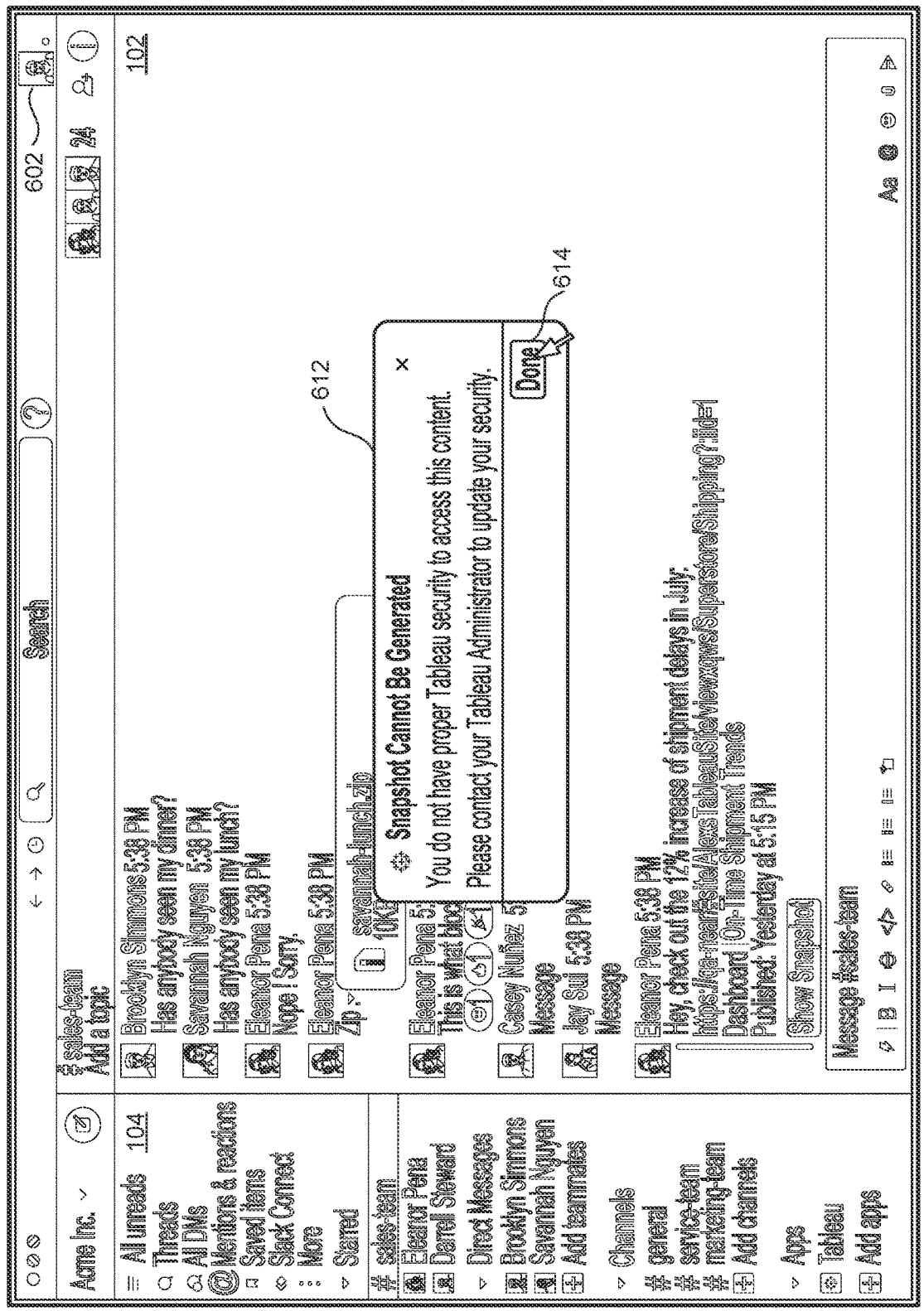

FIG. 6D illustrates the notification received by a receiving user 602 who selects the "Show Snapshot" button 604 in FIG. 6A. The graphical user interface 100 in FIG. 6D illustrates a notification 612, alerting the receiving user 602 that the user does not have proper security to access the contents of the graphical data visualization 302. FIG. 6D further shows the receiving user 602 selecting the "Done" button 614 to dismiss notification 612. In some implementations, the notification 612 is a pop-up notification. In some implementations, the notification 612 is a message notification.

Figure 7A:
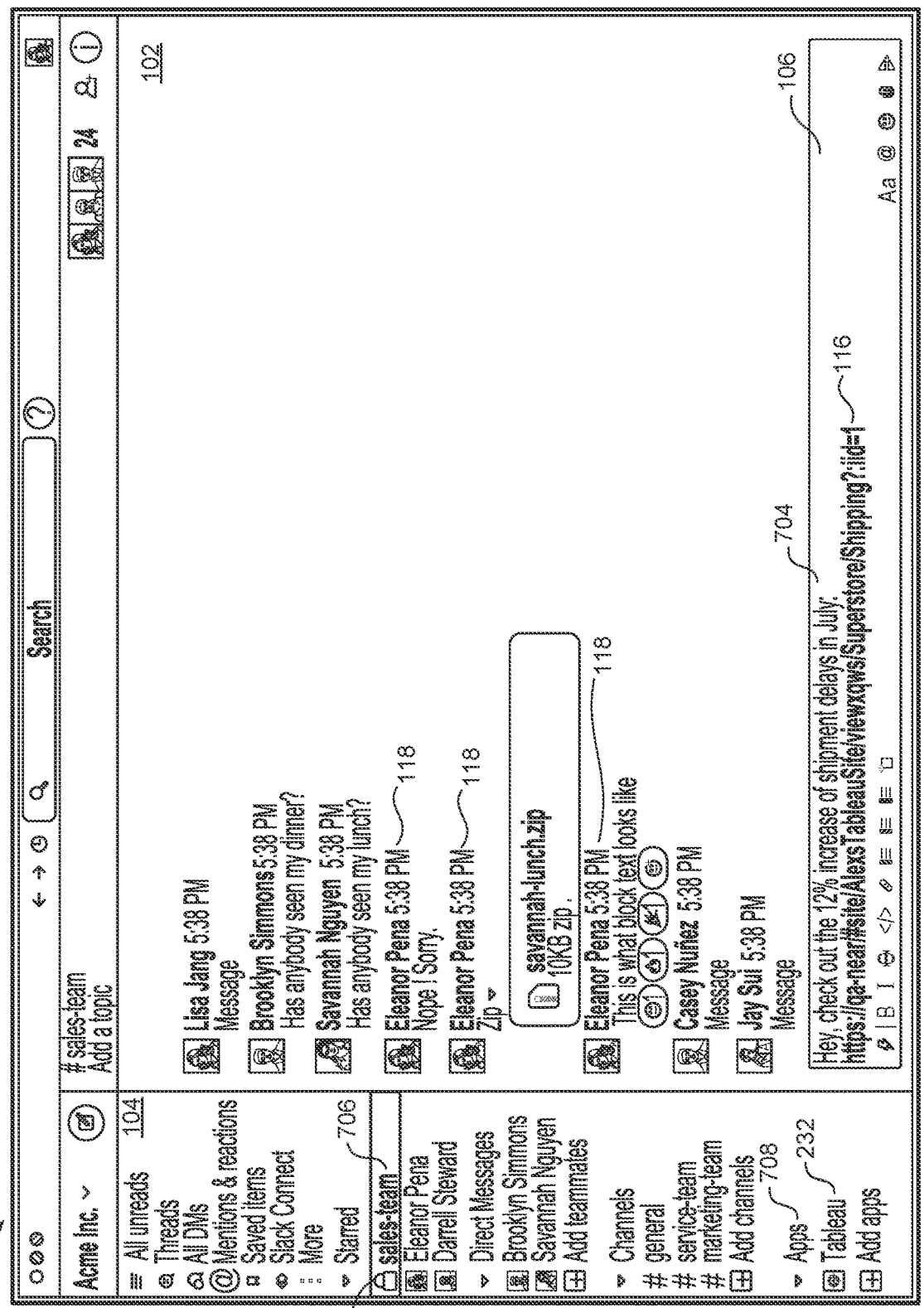
FIGS. 7A-7C illustrate user interactions with the graphical user interface of a communication application, in accordance with some implementations.
Figure 7B:
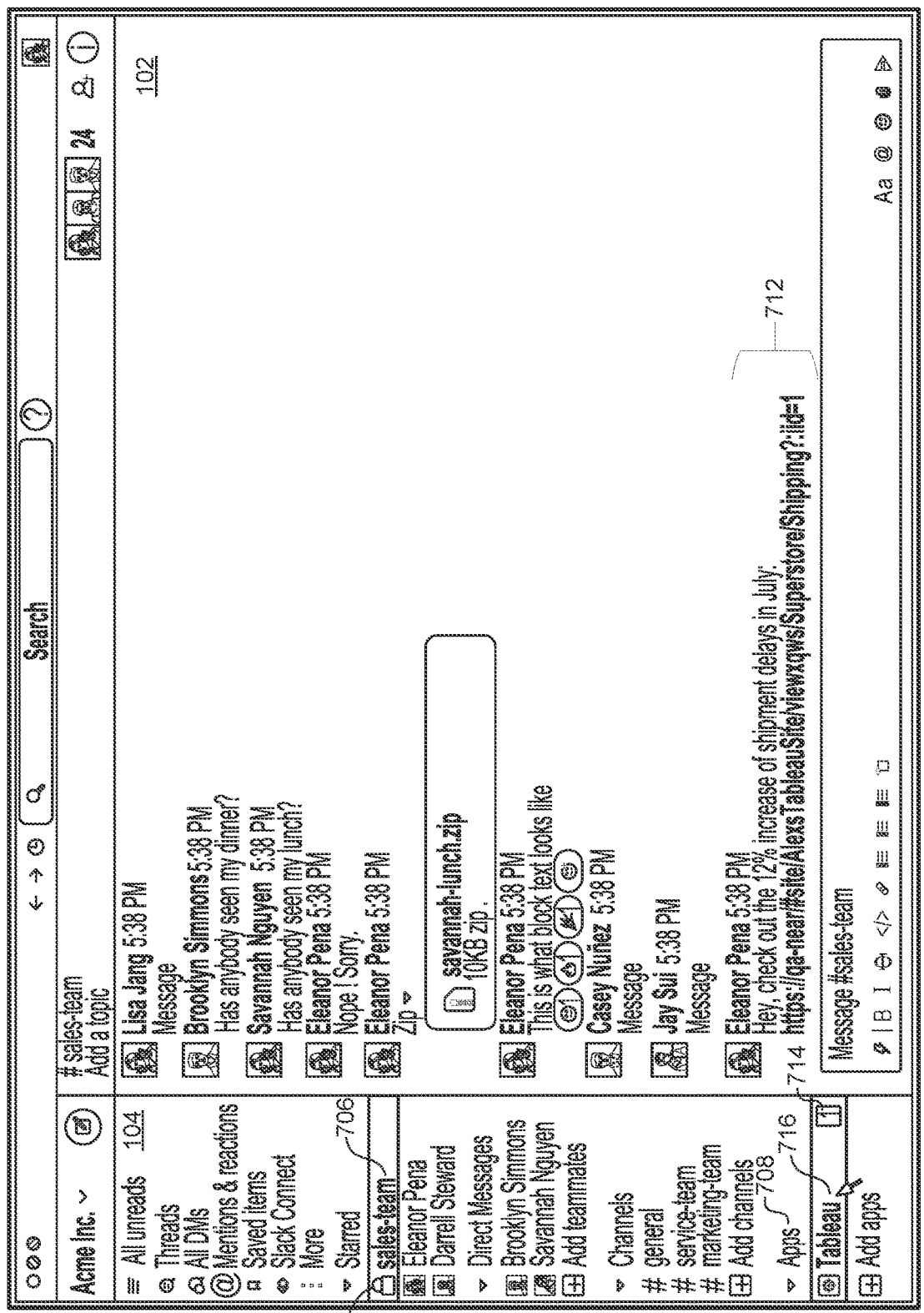
Figure 7C:
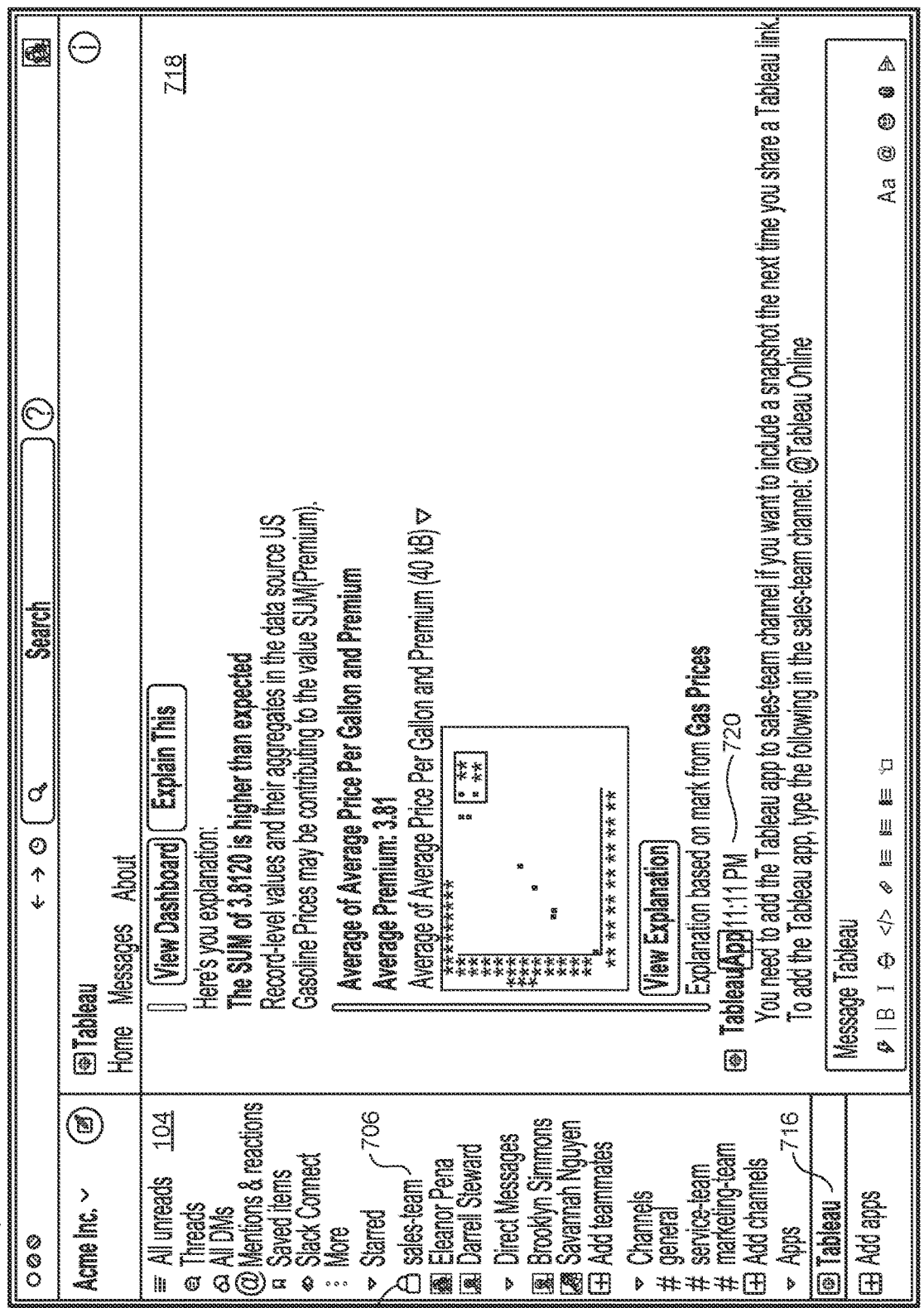

FIGS. 7A-7C illustrate interaction by a sending user 118 with the graphical user interface 100 in a private messaging channel 706 in accordance with some implementations. FIG. 7A illustrates the sending user 118 typing a message 704 into the data entry box 106 for the private "sales-team" channel 706. In some implementations, the private status of the "sales-team" channel 706 is indicated by the lock icon 702. The sending user 118 pastes into the message 704 the link 116 to the graphical data visualization 302 from the data analysis application 232. In some implementations, the navigation tab 104 of the communication application view 100 includes the selected private "sales-team" channel 706, and other channels, including "Apps" channels 708. In some implementations the "Apps" channels 708 include a list of channels for applications integrated with the communication application 222. In some implementations, the data analysis application 232 is the Tableau data analysis application.

FIG. 7B shows a notification received by the sending user 118 when the data analysis application 232 (e.g. Tableau) has not been added to the private channel 706. In some implementations, after the sending user 118 sends the message 712 containing link 116 to a graphical data visualization 302, in a private channel 706, the sending user 118 receives a notification 714 in the navigation tab 104 under the Apps channels 708 for the data analysis application 232. FIG. 7B shows the user selecting the Tableau channel 716, located in the navigation tab 104 under the "Apps" channels 708. In some implementations, selecting the Tableau channel 716 redirects the user to the communication channel 718. The communication channel 718 in FIG. 7C corresponds to the Tableau channel 716.

FIG. 7C illustrates the interface 100 for an application channel 716 in accordance with some implementations. FIG. 7C illustrates the notification 720 received by the sending user 118. The notification 720 alerts the sending user 118 to add the data analysis application 232 to the private channel 706 in order to be able to share link snapshots, such as the link snapshot 112 depicted in FIG. 1. In some implementations, the sending user types some information into the private channel 706 in order to add the graphical data analysis application 232 for generating link snapshots to the private channel 706. In some implementations, the message 720 contains detailed instructions on how to integrate the data analysis application 232 into the private channel 706.

Figure 8A:
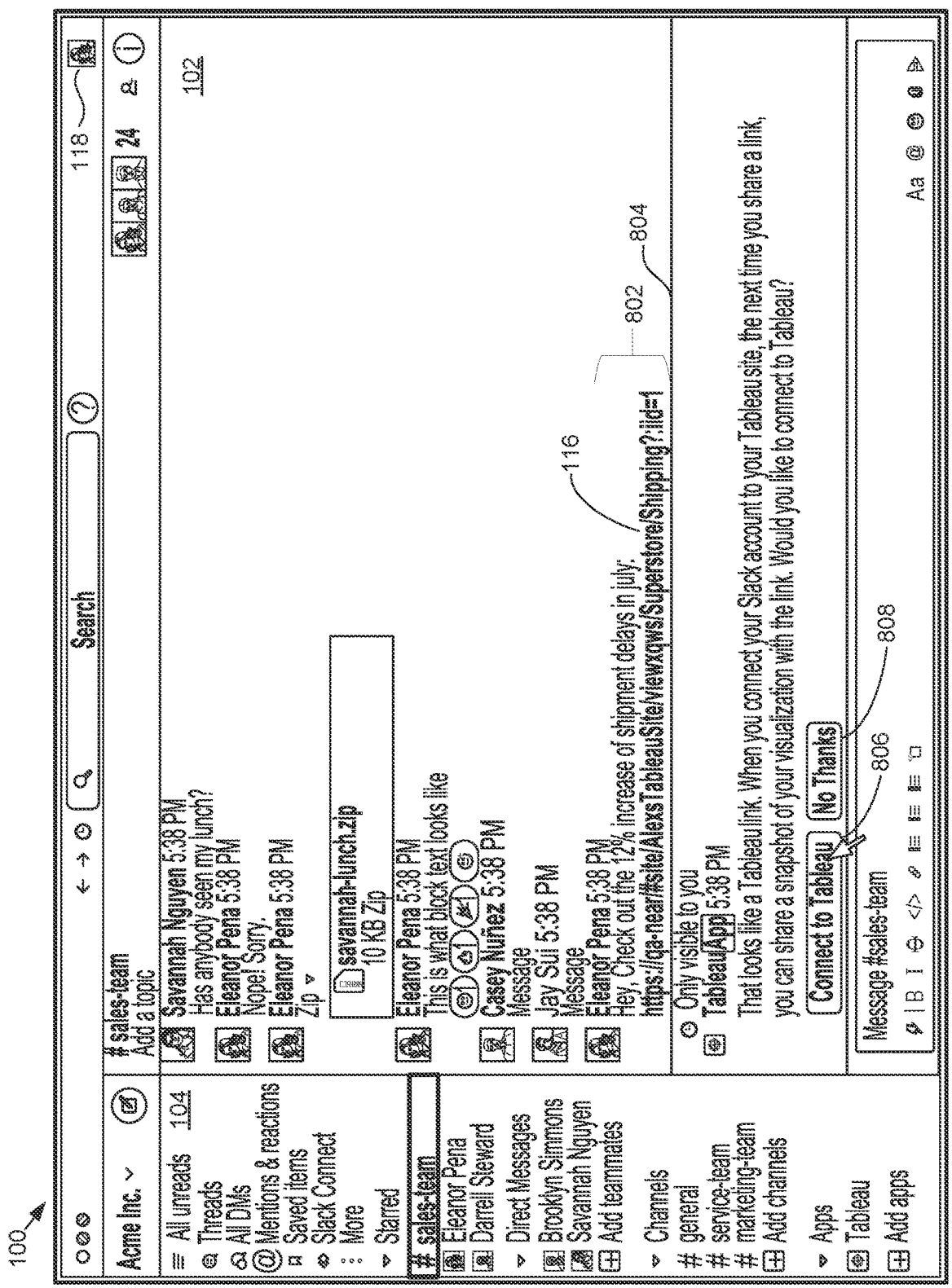
FIGS. 8A-8C illustrate user interactions with the graphical user interface of FIG. 1, in accordance with some implementations.
Figure 8B:
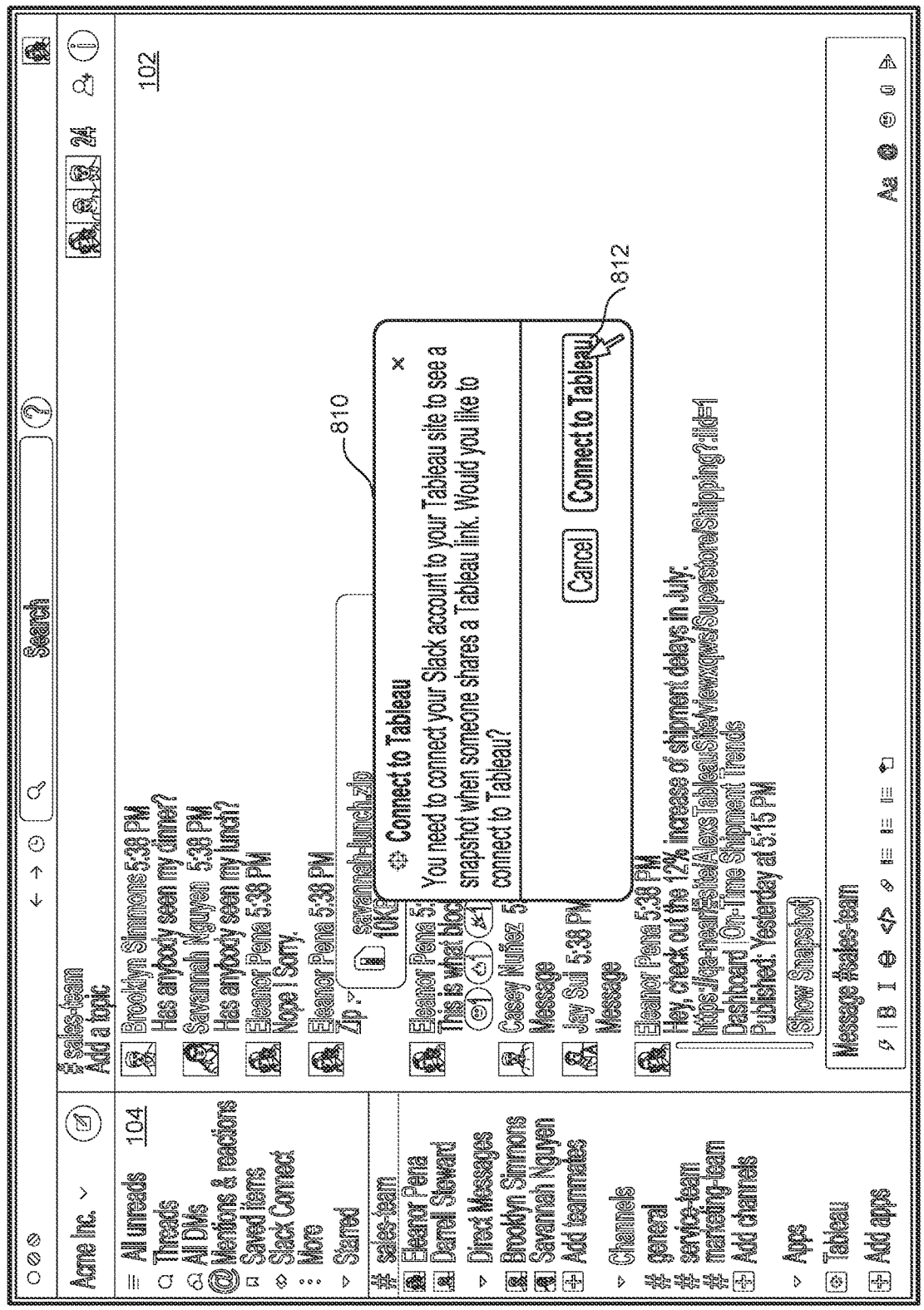
Figure 8C:
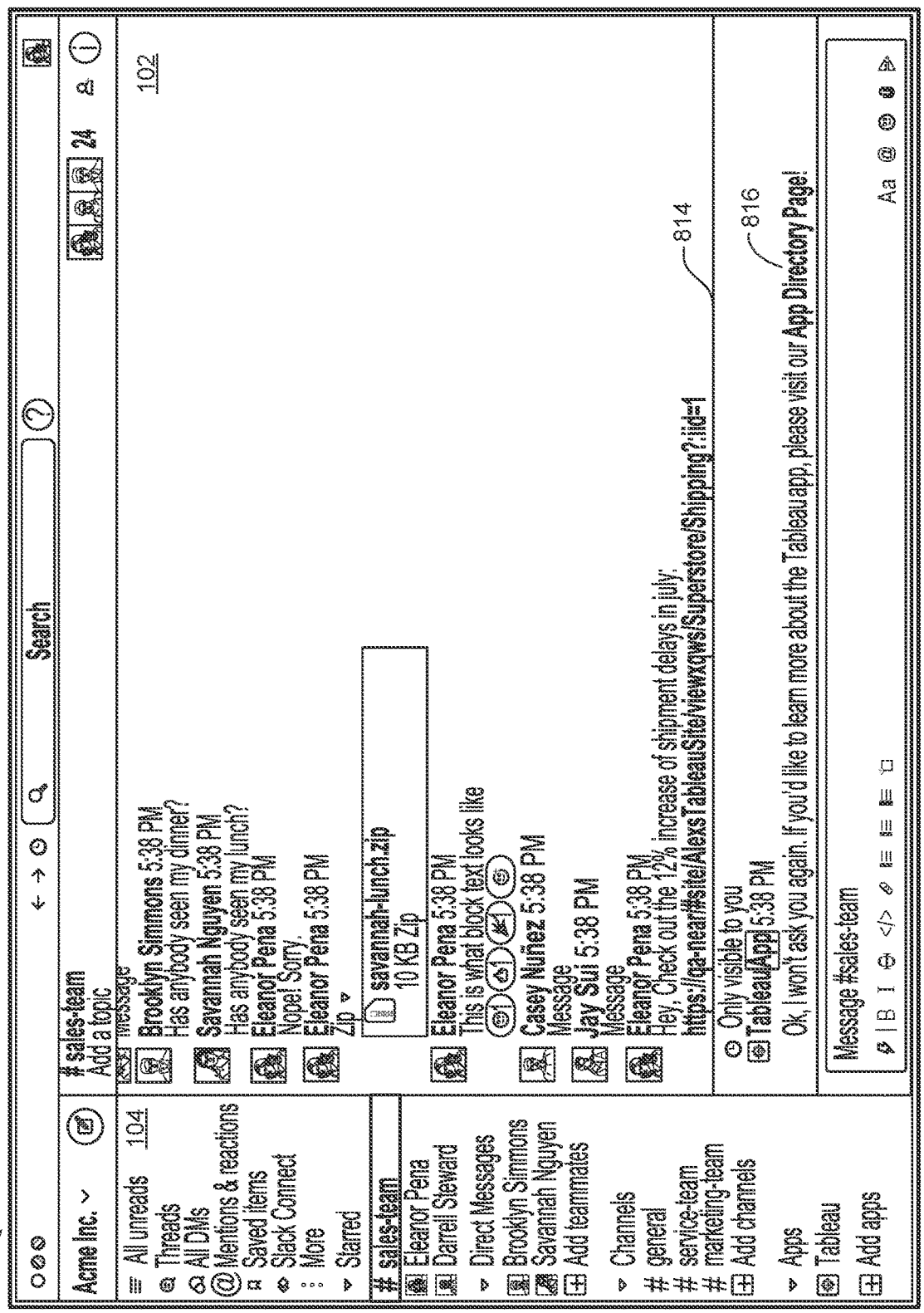

FIGS. 8A-8C illustrate interaction by a sending user 118 with the graphical user interface 100 when the sending user has not connected a data analysis application 232 account to the communication application 222 in accordance with some implementations. FIG. 8A illustrates a notification 804 received by the sending user 118 after sending a message 802, which contains a link 116 to the graphical data visualization 302 from the data analysis application 232. The communication application 222 recognizes the shared link 116 as a link to a graphical data visualization 302 from the data analysis application 232 (e.g., Tableau). In some implementations, the communication application 222 alerts the sending user 118 that the communication application 222 has not been linked to the data analysis application 232 via a notification 804. In some implementations, the notification 804 contains a "Connect to Tableau" button 806, which allows the user to proceed in connecting the communication application 222 to the data analysis application 232. In some implementations, the notification 804 contains a "No Thanks" button 808, which dismisses the notification 804. FIG. 8A further illustrates the sending user selecting the "Connect to Tableau" button 806.

FIG. 8B illustrates the notification received by a sending user 118 upon selecting the "Connect to Tableau" button 806 in FIG. 8A. The graphical user interface 100 in FIG. 8B illustrates a notification 810, alerting the sending user 118 of the need to connect the communication application 222 (e.g., Slack) to the data analysis application 232 (e.g., Tableau) to be able to generate link snapshots. In some implementations, the notification 810 contains a "Connect to Tableau" button 812. FIG. 8B further shows the sending user 118 selecting the "Connect to Tableau" button 812, which redirects the user to log into the data analysis application 232. In some implementations, logging into the data analysis application 232 from the communication application 222 allows the sending user 118 to connect the graphical data analysis application 232 to the communication application 222. In some implementations, the notification 810 is a pop-up notification. In some implementations, the notification 810 is a message notification.

FIG. 8C illustrates a notification received by the sending user 118 upon selecting the "No Thanks" button 808 in FIG. 8A. The graphical user interface 100 in FIG. 8C illustrates a notification 814, alerting the sending user 118 that the communication application 222 won't further prompt the user to connect the data analysis application 232 to the communication application 222. In some implementations, the notification 814 contains a link 816 to an App Directory Page for the data analysis application 232. In some implementations, the App directory Page for the data analysis application 232 provides a user more information about the data analysis application 232, and its integration with the communication application 222.

Figure 9A:
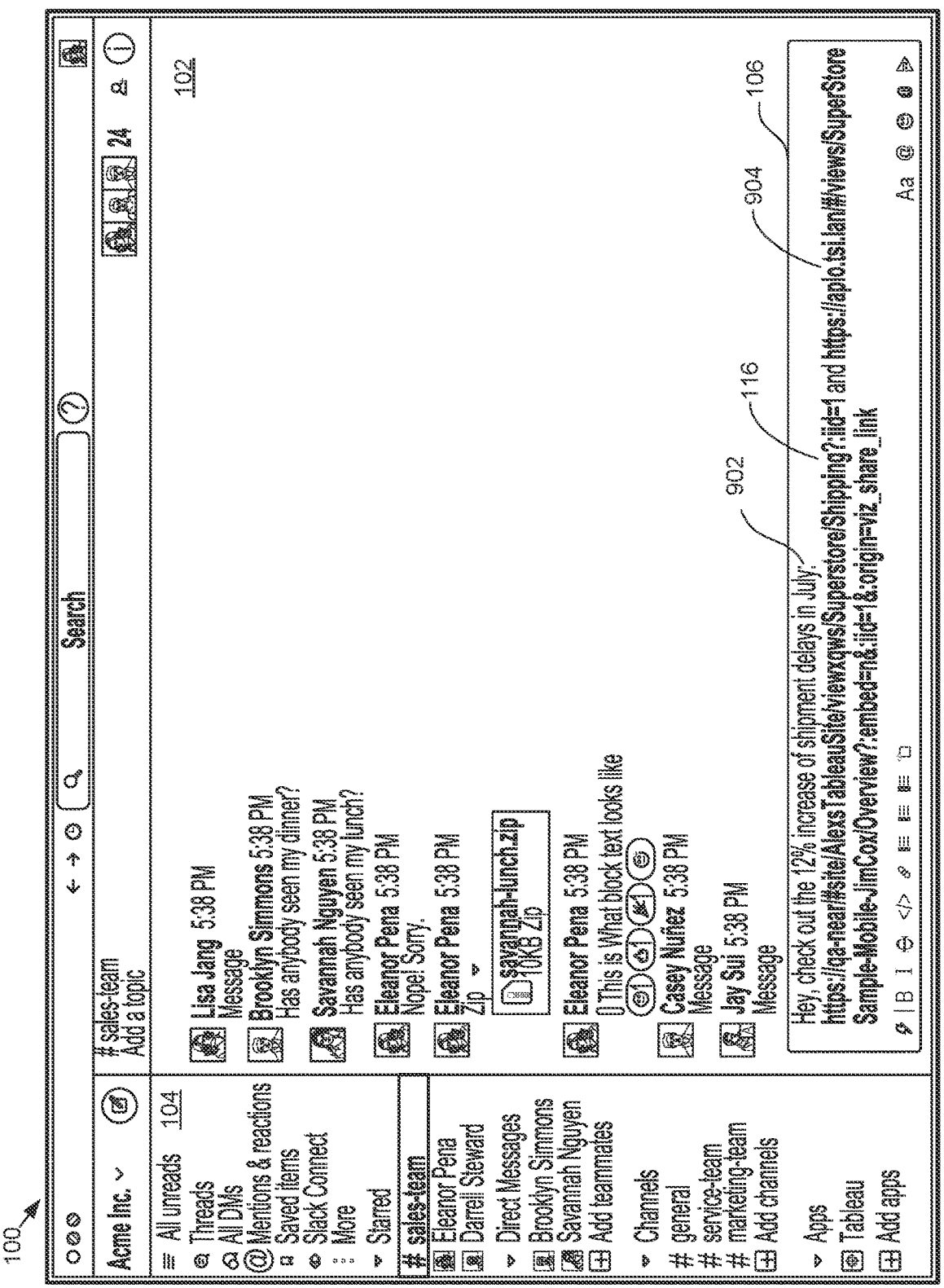
FIGS. 9A-9D illustrate user interactions with the graphical user interface of FIG. 1, in accordance with some implementations FIGS. 10A-10C provide a flowchart of a process for using a communication application to analyze and distribute data analytics, in accordance with some implementations.

FIGS. 9A-9D illustrate an interaction by the sending user 118 with the graphical user interface 100, when the sending user 118 sends multiple links to distinct graphical data visualizations, in accordance with some implementations. FIG. 9A illustrates the sending user 118 typing a message 902 into the data entry box 106 for the public "sales-team" channel 108. The sending user 118 pastes into the message 902 two links 116 and 904. The first link 116 leads to the graphical data visualization 302 from the data analysis application 232. The second link 904 leads to a second graphical data visualization from the data analysis application that is distinct from the graphical data visualization 302. In some instances, the sending user 118 performs the actions depicted in FIGS. 9A-9D in a direct message to a particular individual instead of a group.

Figure 9B:
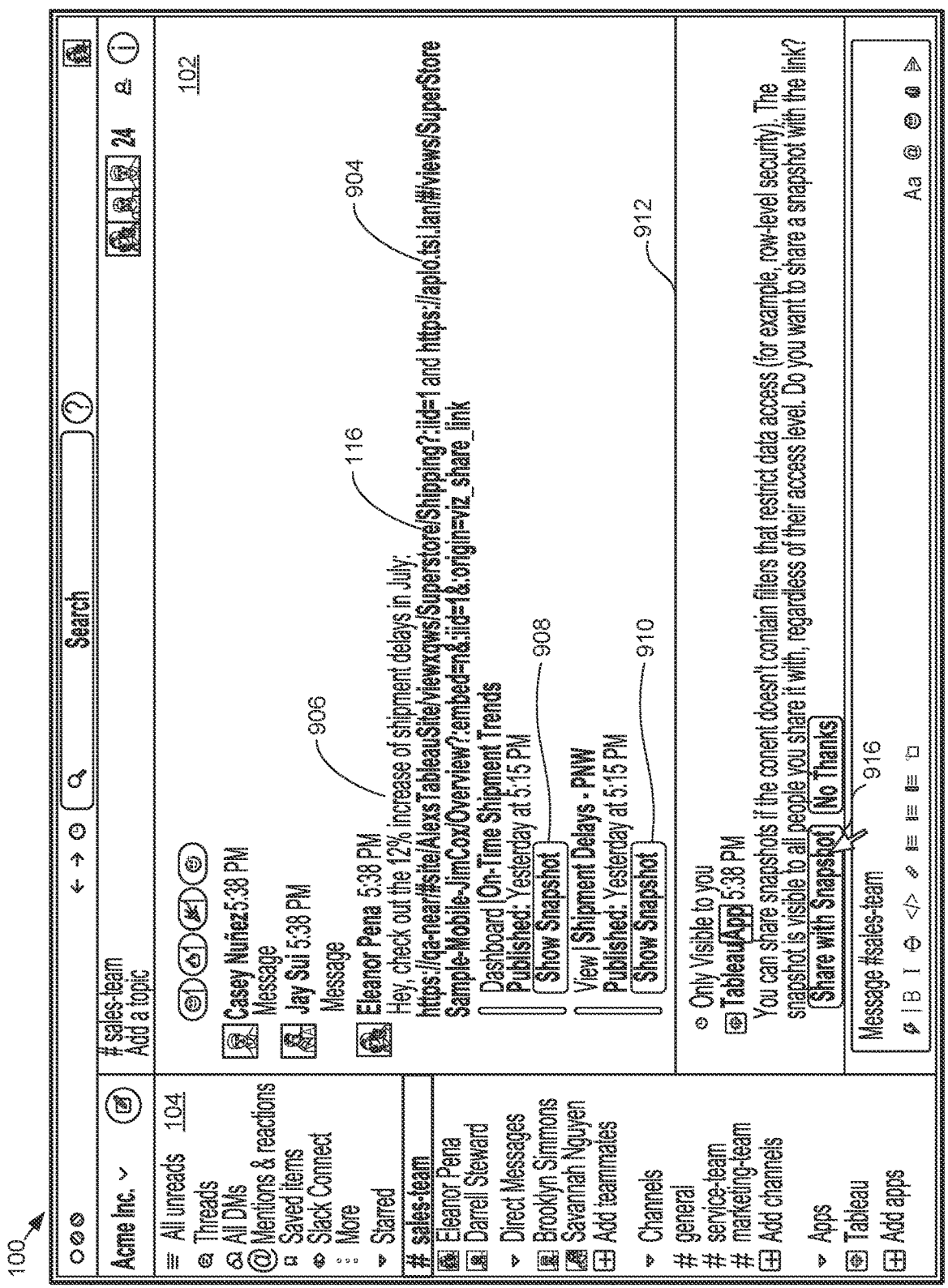

FIG. 9B shows the graphical user interface 100 of the communication application 222 after the sending user 118 sends the message 902. In accordance with some implementations, the communication application recognizes the links 116 and 904 as links to graphical data visualizations from the data analysis application 232. The communication application 222 therefore includes two "Show Snapshot" buttons 908 and 910 in the sent message 906. In practice, and as recognized by those of ordinary skill in the art, the "Show Snapshot" buttons 908 and 910 can be placed anywhere in the spatial vicinity of the message 906. The sent message 906, including the "Show Snapshot" buttons 908 and 910, is visible to all receiving users with access to the "sales-team" 108 channel.

In some implementations, upon sending the message 906, the sending user 118 receives a notification 912. The notification 912 informs the sending user 118 that the user can share both links with snapshots for all of the members in the "sales-team" channel 108, as long as content of the graphical data visualizations does not contain filters that restrict data access (i.e., the content of the graphical data visualizations does not have security restrictions). The notification 912 also includes a "Share with Snapshot" button 916. In some implementations, the sending user 118 is able to select the "Share with Snapshot" button 916 to generate both snapshots for all receiving users. In some implementations, when the graphical data visualization represented by the first link 116 contains filters that restrict data access, the system will only generate a snapshot for the second link 904 for all receiving users.

In some implementations, the notification 912 allows the sending user 118 to generate a snapshot visible to all receiving users even when the content in the linked graphical data visualizations contains filters that restrict data access. In those cases, when the sending user 118 activates the "Share with Snapshot" button 916, the system dynamically generates the link snapshots for each link (e.g., 116 and 904) based on each receiving user's security. For those receiving users who have appropriate security to access a subset of data in the graphical data visualizations contained in links 116 and 904, the present invention dynamically adjusts each link snapshot for each receiving user based on individual security permissions.

Figure 9C:
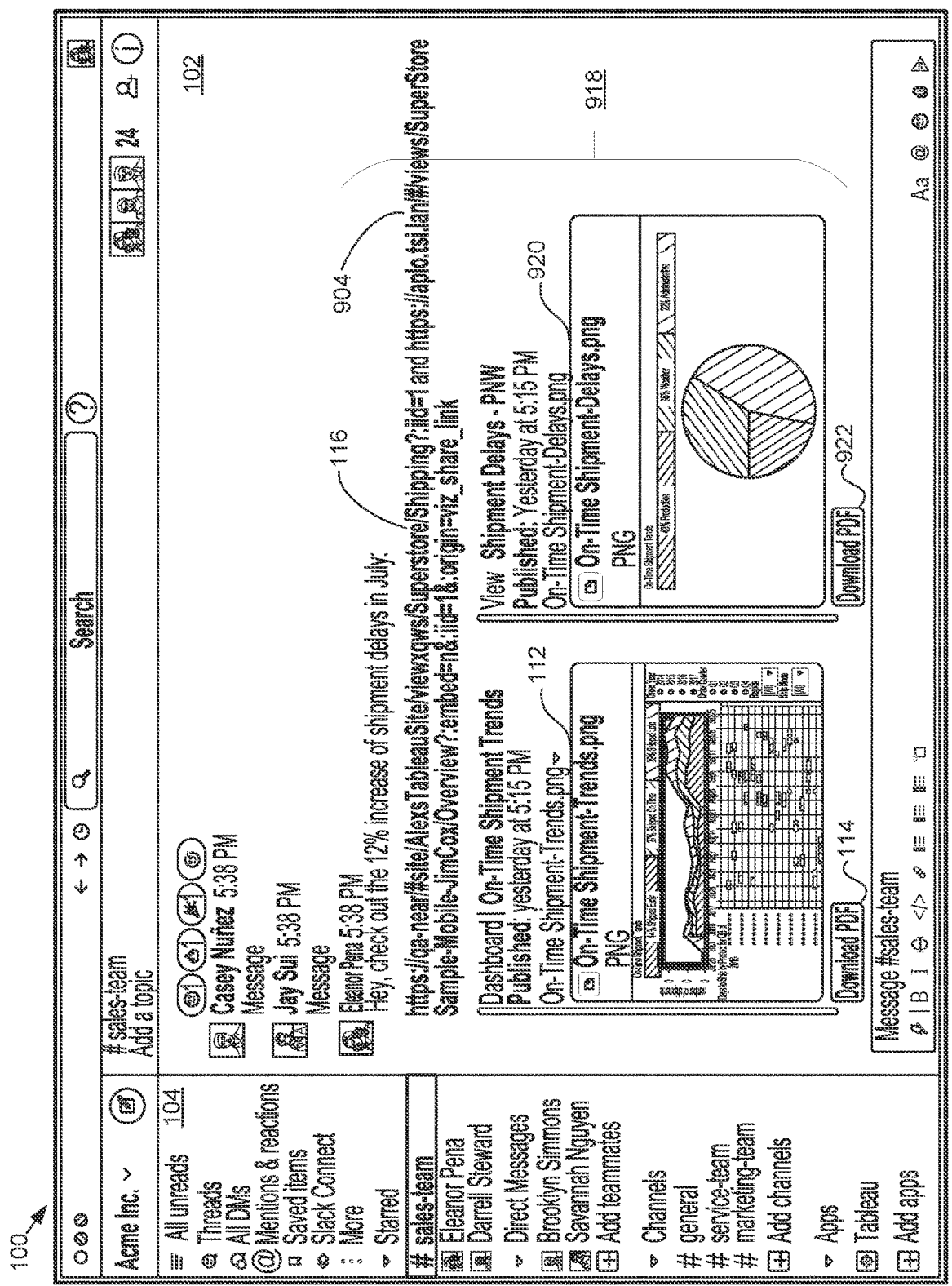

FIG. 9B further shows the sending user 118 selecting the "Share with Snapshot" button 916. In some implementations, in response to the sending user 118 selecting the "Share with Snapshot" button 916, the system generates the link snapshots 112 and 920 for all receiving users, as depicted in FIG. 9C. In some implementations, when the shared graphical data visualizations contain filters that restrict data access, in response to the sending user 118 selecting the "Share with Snapshot" button 916, the system dynamically generates link snapshots for receiving users who have security access to a subset of data contained in each graphical data visualization. In some implementations, when the shared graphical data visualizations contain filters that restrict data access, in response to the sending user 118 selecting the "Share with Snapshot" button 916, the system generates a notification 502, as shown in FIG. 5. In some implementations, in response to the sending user selecting the "Show Snapshot" button 908, the system generates the link snapshot 112 for the sending user only as depicted in FIG. 9D.

FIG. 9C demonstrates the graphical user interface 100 after the snapshots for both links 116 and 904 have been generated in accordance with some implementations. The sent message 918 contains the two links 116 and 904, and also contains the corresponding snapshots 112 and 920. The first link snapshot 112 corresponds to the graphical data visualization shared in the first link 116, while the second link snapshot 920 corresponds to the graphical data visualization shared in the second link 904. In some implementations, the graphical user interface for receiving users will be the same as that for the sending user 118. The download buttons 114 and 922 enable users to download the link snapshots.

Figure 9D:
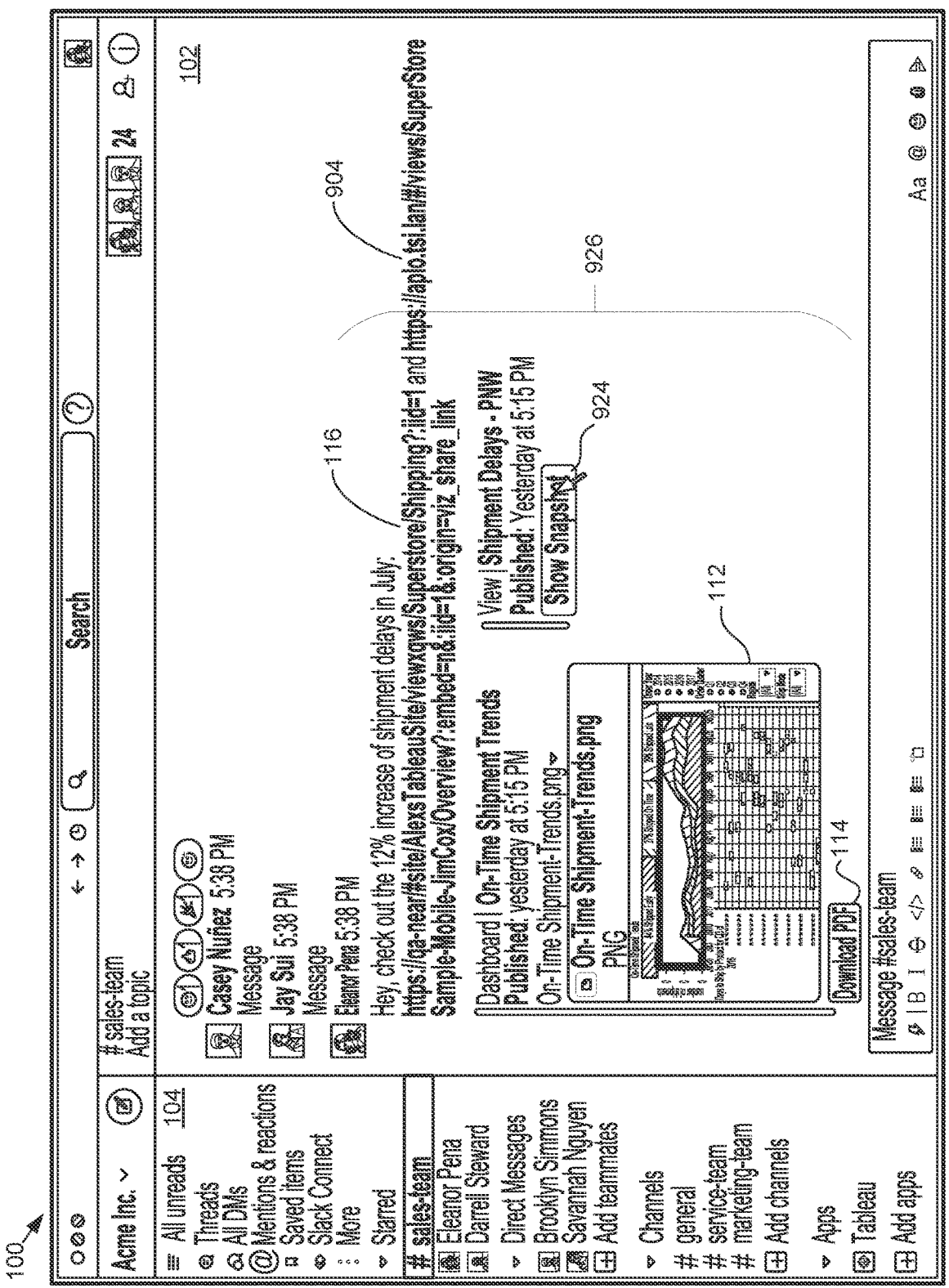

FIG. 9D demonstrates the graphical user interface 100 after the sending user selects the "Show Snapshot" button 908 in FIG. 9B. In some implementations, when the sending user 118 selects the "Show Snapshot" button 908, the system only generates the link snapshot 112 for the first link 116 as shown in the message 926 of FIG. 9D. The message 926 in FIG. 9D also shows the sending user 118 selecting the "Show Snapshot" button 924, which allows the sending user 118 to generate the second link snapshot 920 as depicted in FIG. 9C. In some implementations, the receiving users may select the "Show Snapshot" buttons after receiving the message with the links.

Figure 10A:
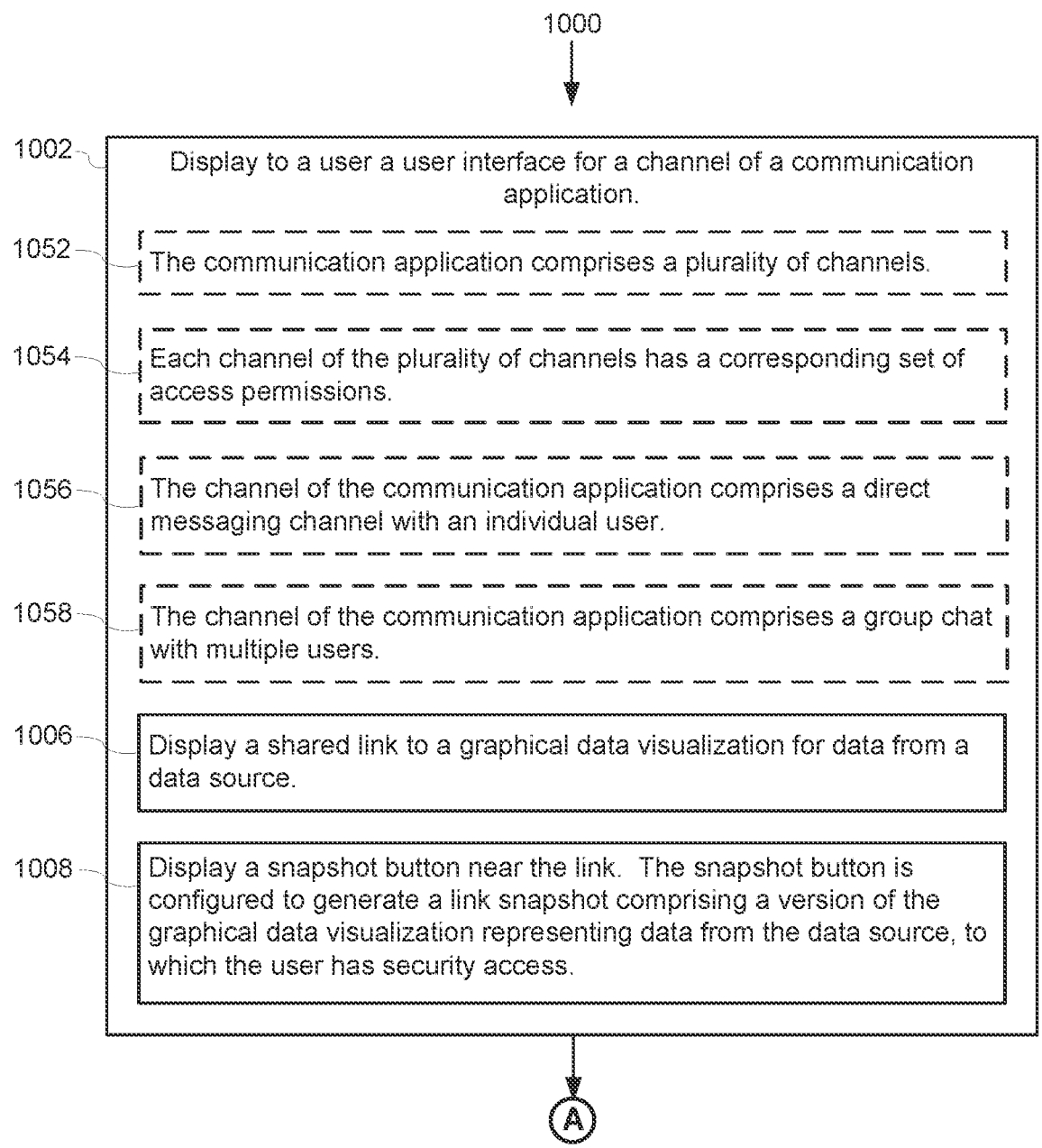
Figure 10B:
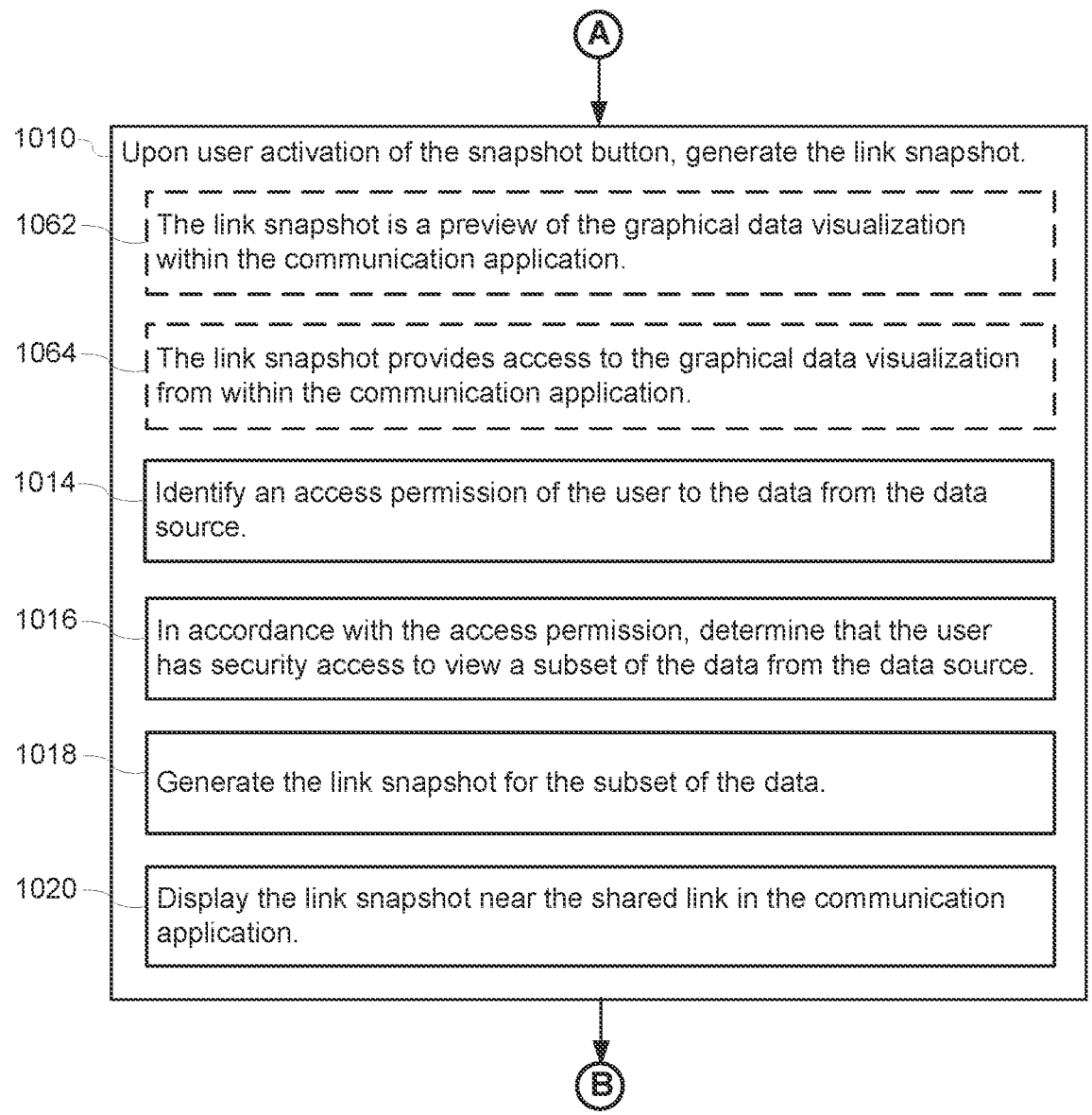
Figure 10C:
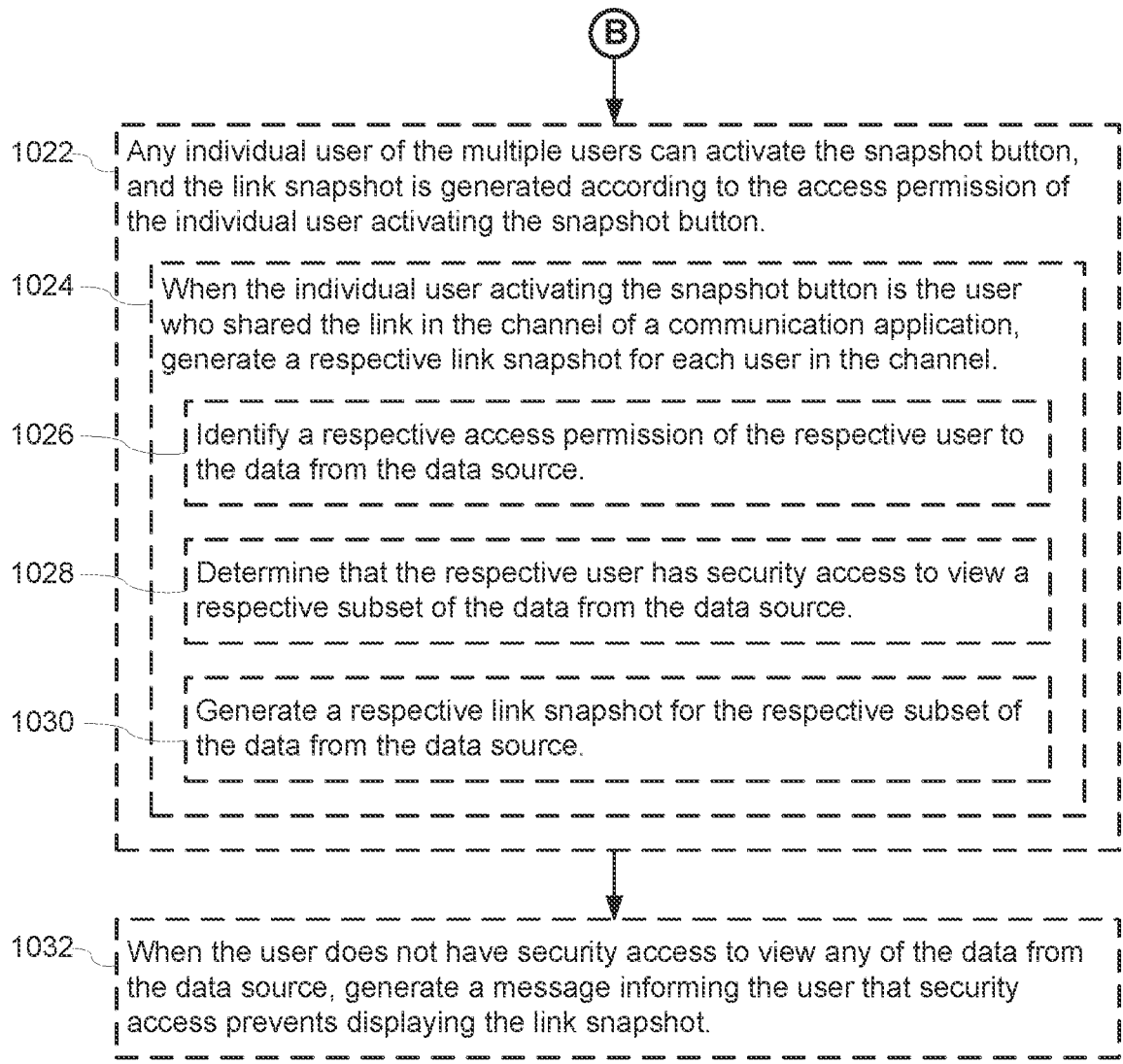

FIGS. 10A-10C provide a flowchart of a method 1000 for using a communication application to provide an instant messaging interface for data analytics. The method 1000 is performed at a computing system (e.g., the computing device 200) having a display, one or more processors, and memory. In some implementations, the memory stores one or more programs configured for execution by the one or more processors.

The computing system displays (1002) to a user a user interface for a channel of a communication application. In some implementations, the communication application includes (1052) a plurality of channels. In some implementations, each channel of the plurality of channels has (1054) a corresponding set of access permissions. In some implementations, the channel of the communication application comprises (1056) a direct messaging channel with an individual user. In some implementations, the channel of the communication application is (1058) a group chat with multiple users.

The computing system displays (1006) a shared link to a graphical data visualization of data from a data source (e.g., the link 116 in FIG. 6A). The computing system also displays (1008) a snapshot button near the link (e.g. the "Show Snapshot" button 604 in FIG. 6A). The snapshot button is configured to generate a link snapshot comprising a version of the graphical data visualization representing data from the data source, to which the user has security access (e.g., the link snapshot 112 in FIG. 1).

Upon user activation of the snapshot button, the computing system generates (1010) the link snapshot. In some implementations, the link snapshot is (1062) a preview of the graphical data visualization within the communication application. In some implementations, the link snapshot provides access to the graphical data visualization from within the communication application (as illustrated in FIGS. 1 and 4).

The computing system identifies (1014) an access permission of the user to the data from the data source. In accordance with the access permission, the computing system determines (1016) that the user has security access to view at least a subset of the data from the data source. The computing system generates (1018) the link snapshot for the subset of the data. The computing system displays (1020) the link snapshot near the shared link in the communication application.

In some implementations, any individual user (1022) of the multiple users can activate the snapshot button, and the link snapshot is generated according to the access permission of the individual user activating the snapshot button. In some implementations, when the individual user activating the snapshot button is the user who shared the link in the channel of a communication application, the computing system generates (1024) a respective link snapshot for each user in the channel. In some implementations, generating a respective link snapshot includes identifying (1026) a respective access permission of the respective user to the data from the data source. In some implementations, generating a respective link snapshot includes determining (1028) that the respective user has security access to view a respective subset of the data from the data source. In some implementations, generating a respective link snapshot includes and (iii) generating (1030) a respective link snapshot for the respective subset of the data from the data source.

In some implementations, when the user does not have security access to view any of the data from the data source, the computing system generates (1032) a message informing the user that security access prevents displaying the link snapshot (e.g., as shown in FIG. 6D).

(A1) In one aspect, some implementations include a method (e.g., the method 1000) for using a communication application to provide an instant messaging interface for data analytics. The method includes: (i) displaying to a user a user interface for a channel of a communication application (e.g., the communication application 222) including: (a) displaying a shared link to a graphical data visualization for data from a data source; and (b) displaying a snapshot button near the link, where the snapshot button is configured to generate a link snapshot comprising a version of the graphical data visualization representing data from the data source to which the user has security access; (ii) in response to user activation of the snapshot button, generating the link snapshot by: (a) identifying an access permission of the user to the data from the data source, (b) in accordance with the access permission, determining that the user has security access to view a subset of the data from the data source, (c) generating the link snapshot for the subset of the data, and (d) displaying the link snapshot near the shared link in the communication application.

(A2) In some implementations of A1, the link snapshot is a preview of the graphical data visualization (e.g., the link snapshot 112 in FIG. 1) within the communication application.

(A3) In some implementations of A1 or A2, the link snapshot provides access to the graphical data visualization from within the communication application (e.g., as shown in FIG. 4).

(A4) In some implementations of A1-A3, the user activating the snapshot button is the same user who shared the shared link (e.g., as shown in FIGS. 3A-3D).

(A5) In some implementations of A1-A3, the user activating the snapshot button is different from the user who shared the shared link (e.g., as shown in FIGS. 6A-6D).

(A6) In some implementations of A1-A5, the communication application comprises a plurality of channels (e.g., the "sales-team" channel 108), where each channel of the plurality of channels has a corresponding set of access permissions.

(A7) In some implementations of A1-A6, the channel of the communication application comprises a direct messaging channel with an individual user.

(A8) In some implementations of A1-A6, the channel of the communication application comprises a group chat with multiple users.

(A9) In some implementations of A8, any individual user of the multiple users can activate the snapshot button, and the link snapshot is generated according to the access permission of the individual user activating the snapshot button.

(A10) In some implementations of A9, the individual user activating the snapshot button is the user who shared the link in the channel of the communication application, and the method further comprises generating a respective link snapshot for each user in the channel. For each user, the method includes: (i) identifying a respective access permission of the respective user to the data from the data source, (ii) determining that the respective user has security access to view a respective subset of the data from data source, and (iii) generating a respective link snapshot for the respective subset of the data from the data source. In some instances, the "subset" is all of the data.

(A11) In some implementations of A1-A10, the user does not have security access to view any of the data from the data source. The system generates a message informing the user that security access prevents displaying the link snapshot (e.g., the notification 612 in FIG. 6D).

(A12) In some implementations of A1-A11, the subset of data from the data source comprises all of the data required to generate the graphical data visualization.

(A12) In some implementations of A1-A11, the subset of data from the data source comprises less than all of the data required to generate the graphical data visualization.

(A13) In some implementations of A1-A12, the communication application generates multiple link snapshot based on user security access for multiple users.

In another aspect, some implementations include a computing system including one or more processors and memory coupled to the one or more processors, the memory storing one or more programs configured to be executed by the one or more processors. The one or more programs include instructions for performing any of the methods described herein (e.g., A1-A13 above).

In yet another aspect, some implementations include a non-transitory computer-readable storage medium storing one or more programs for execution by one or more processors of a computing system, the one or more programs including instructions for performing any of the methods described herein (e.g., A1-A13 above).

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method, comprising:
at a computing device having a display, one or more processors and memory storing one or more programs configured for execution by the one or more processors:
displaying, via the display to a receiving user, a user interface for a channel of a communication application, including:
displaying a shared link to a graphical data visualization of data from a data source; and
displaying a snapshot button near the shared link, wherein the snapshot button is configured to generate a link snapshot comprising a version of the graphical data visualization representing data from the data source, to which the receiving user has security access, wherein the link snapshot includes a preview of the graphic data visualization; and
in response to an activation of the snapshot button by the receiving user, generating the link snapshot, including:
identifying an access permission of the receiving user to the data from the data source;
in accordance with the access permission, determining that the receiving user has security access to view a subset of the data from the data source;
dynamically generating the link snapshot for the subset of the data according to the access permission of the receiving user; and
displaying the link snapshot near the shared link in the user interface of the communication application.

2. The method of claim 1, wherein the link snapshot provides access to the graphical data visualization from within the communication application.

3. The method of claim 1, wherein the receiving user activating the snapshot button is a same user who shared the shared link.

4. The method of claim 1, wherein the receiving user activating the snapshot button is different from a user who shared the shared link.

5. The method of claim 1, wherein:
the communication application comprises a plurality of channels; and
each channel of the plurality of channels has a corresponding set of access permissions.

6. The method of claim 1, wherein the channel of the communication application comprises a direct messaging channel with an individual user.

7. The method of claim 1, wherein the channel of the communication application comprises a group chat with multiple users.

8. The method of claim 7, wherein any individual user of the multiple users can activate the snapshot button, and the link snapshot is generated according to access permission of an individual user activating the snapshot button.

9. The method of claim 8, wherein the individual user activating the snapshot button is a user who shared the shared link in the channel of a communication application, and the method further comprises generating a respective link snapshot for each user in the channel, including, for each user:
identifying a respective access permission of the respective user to the data from the data source;
determining that the respective user has security access to view a respective subset of the data from data source; and
generating a respective link snapshot for the respective subset of the data from the data source.

10. The method of claim 1, wherein, when a user does not have security access to view any of the data from the data source, generating a message informing the user that security access prevents displaying the link snapshot.

11. The method of claim 1, wherein the subset of data from the data source comprises all of the data required to generate the graphical data visualization.

12. The method of claim 1, wherein the subset of data from the data source comprises less than all of the data required to generate the graphical data visualization.

13. A computing device, comprising:
one or more processors;
memory;
a display; and
one or more programs stored in the memory and configured for execution by the one or more processors, the one or more programs comprising instructions for:
displaying, via the display to a receiving user, a user interface for a channel of a communication application, including:
displaying a shared link to a graphical data visualization of data from a data source; and
displaying a snapshot button near the shared link, wherein the snapshot button is configured to generate a link snapshot comprising a version of the graphical data visualization representing data from the data source, to which the receiving user has security access, wherein the link snapshot includes a preview of the graphic data visualization; and
in response to activation of the snapshot button by the receiving user, generating the link snapshot, including:
identifying an access permission of the receiving user to the data from the data source;
in accordance with the access permission, determining that the receiving user has security access to view a subset of the data from the data source;
dynamically generating the link snapshot for the subset of the data according to the access permission of the receiving user; and
displaying the link snapshot near the shared link in the user interface of the communication application.

14. The computing device of claim 13, wherein the channel of the communication application comprises a group chat with multiple users.

15. The computing device of claim 14 wherein any individual user of the multiple users can activate the snapshot button, and the link snapshot is generated according to access permission of an individual user activating the snapshot button.

16. The computing device of claim 15, wherein the individual user activating the snapshot button is a user who shared the shared link in the channel of a communication application, and the one or more programs further comprising instructions for:
generating a respective link snapshot for each user in the channel, including, for each user:
identifying a respective access permission of the respective user to the data from the data source;
determining that the respective user has security access to view a respective subset of the data from data source; and
generating a respective link snapshot for the respective subset of the data from the data source.

17. A non-transitory computer-readable storage medium storing one or more programs configured for execution by a computing device having one or more processors, memory, and a display, the one or more programs comprising instructions for:
displaying, via the display to a receiving user, a user interface for a channel of a communication application, including:
displaying a shared link to a graphical data visualization of data from a data source; and
displaying a snapshot button near the shared link, wherein the snapshot button is configured to generate a link snapshot comprising a version of the graphical data visualization representing data from the data source, to which the receiving user has security access, wherein the link snapshot includes a preview of the graphic data visualization; and
in response to an activation of the snapshot button by the receiving user, generating the link snapshot, including:
identifying an access permission of the receiving user to the data from the data source;
in accordance with the access permission, determining that the receiving user has security access to view a subset of the data from the data source;
dynamically generating the link snapshot for the subset of the data according to the access permission of the receiving user; and
displaying the link snapshot near the shared link in the user interface of the communication application.

18. The computer-readable storage medium of claim 17, wherein the channel of the communication application comprises a group chat with multiple users, any individual user of the multiple users can activate the snapshot button, and the link snapshot is generated according to access permission of an individual user activating the snapshot button.

19. The computer-readable storage medium of claim 18, wherein the individual user activating the snapshot button is a user who shared the shared link in the channel of a communication application, and the one or more programs further comprising instructions for:

generating a respective link snapshot for each user in the channel, including, for each user:

identifying a respective access permission of the respective user to the data from the data source;

determining that the respective user has security access to view a respective subset of the data from data source; and generating a respective link snapshot for the respective subset of the data from the data source.

\* \* \* \* \*